United States Patent
Kamo et al.

(10) Patent No.: US 10,634,069 B2
(45) Date of Patent: Apr. 28, 2020

(54) CONTROL APPARATUS FOR INTERNAL COMBUSTION ENGINE

(71) Applicant: Toyota Jidosha Kabushiki Kaisha, Toyota-shi, Aichi-ken (JP)

(72) Inventors: Yoshiro Kamo, Kanagawa-ken (JP); Masatoshi Sugiura, Nishio (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 72 days.

(21) Appl. No.: 15/982,321

(22) Filed: May 17, 2018

(65) Prior Publication Data
US 2018/0334970 A1 Nov. 22, 2018

(30) Foreign Application Priority Data

May 19, 2017 (JP) .................. 2017-099823

(51) Int. Cl.
| | |
|---|---|
| *F01L 1/34* | (2006.01) |
| *F02D 13/06* | (2006.01) |
| *F02D 41/00* | (2006.01) |
| *F02D 41/30* | (2006.01) |
| *F02D 17/02* | (2006.01) |
| *F02D 41/06* | (2006.01) |

(52) U.S. Cl.
CPC ............ *F02D 13/06* (2013.01); *F02D 17/02* (2013.01); *F02D 41/0087* (2013.01); *F02D 41/3058* (2013.01); *F02D 41/064* (2013.01); *F02D 2041/0012* (2013.01); *F02D 2200/023* (2013.01); *F02D 2200/024* (2013.01); *F02D 2200/101* (2013.01)

(58) Field of Classification Search
CPC ............ F02D 41/0087; F02D 41/3058; F02D 41/064; F02D 13/06; F02D 17/02; F02D 2200/024; F02D 2200/023; F02D 2200/101; F02D 2041/0012
See application file for complete search history.

(56) References Cited

U.S. PATENT DOCUMENTS

| | | | |
|---|---|---|---|
| 9,180,844 B2* | 11/2015 | Murata | ............ B60T 7/12 |
| 9,387,849 B2* | 7/2016 | Soliman | ............ F02D 29/02 |
| 2013/0092127 A1 | 4/2013 | Pirjaberi et al. | |
| 2013/0092128 A1 | 4/2013 | Pirjaberi et al. | |
| 2015/0075458 A1 | 3/2015 | Parsels et al. | |

(Continued)

FOREIGN PATENT DOCUMENTS

| | | |
|---|---|---|
| JP | 2014532145 A | 12/2014 |
| JP | 2016-532058 A | 10/2016 |
| JP | 2017/115612 A | 6/2017 |

*Primary Examiner* — Zelalem Eshete
(74) *Attorney, Agent, or Firm* — Dinsmore & Shohl LLP

(57) ABSTRACT

A control apparatus is applied to an internal combustion engine equipped with a plurality of cylinders, a variable valve actuation system capable of switching the operation mode of intake and exhaust valve between an inactive mode and an active mode on a cylinder-by-cylinder basis, and a fuel injection valve capable of supplying fuel to each cylinder. When the engine speed is equal to or lower than a first engine speed, the control apparatus performs cylinder deactivation in the internal combustion engine by skip firing control. When the engine speed is higher than the first engine speed, the control apparatus performs cylinder deactivation in the internal combustion engine by fixed deactivated cylinder control.

13 Claims, 14 Drawing Sheets

(56) References Cited

U.S. PATENT DOCUMENTS

| | | |
|---|---|---|
| 2016/0053697 A1 | 2/2016 | Pirjaberi et al. |
| 2016/0108834 A1* | 4/2016 | McConville ........ F02D 41/0087 123/90.15 |
| 2017/0030278 A1 | 2/2017 | Phillips |
| 2017/0067401 A1 | 3/2017 | Pirjaberi et al. |
| 2017/0306864 A1 | 10/2017 | Pirjaberi et al. |
| 2019/0003410 A1 | 1/2019 | Tsunoda |

* cited by examiner

[Fig. 1]
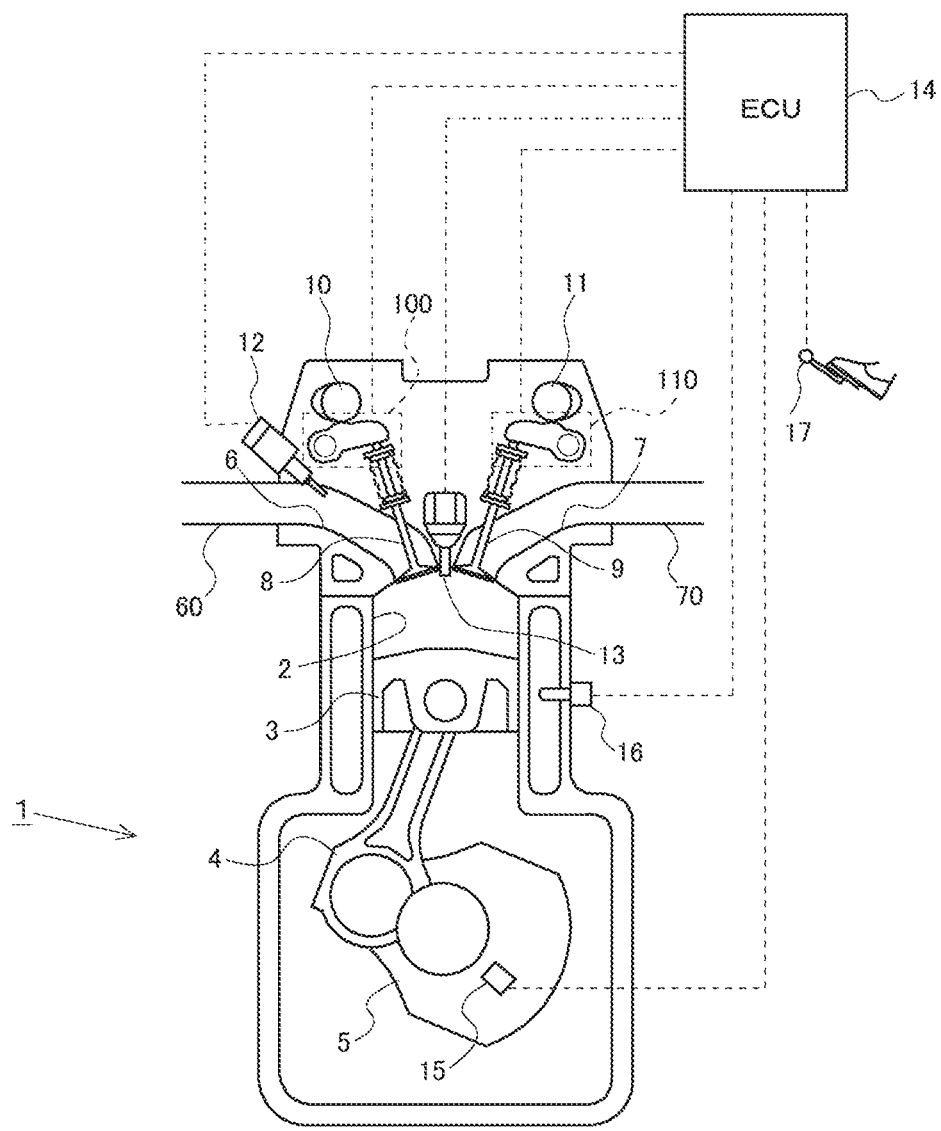

[Fig. 2]
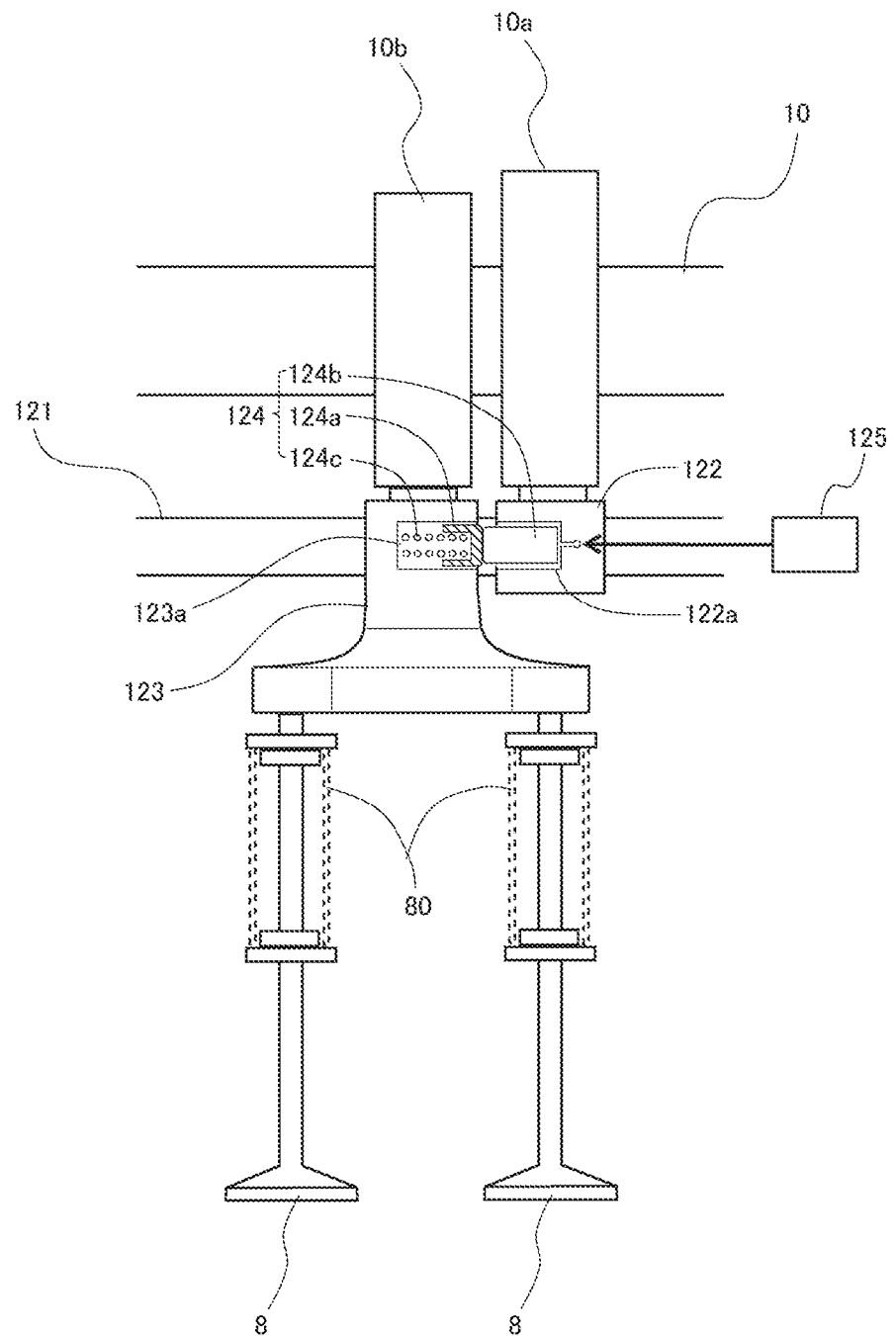

[Fig. 3]
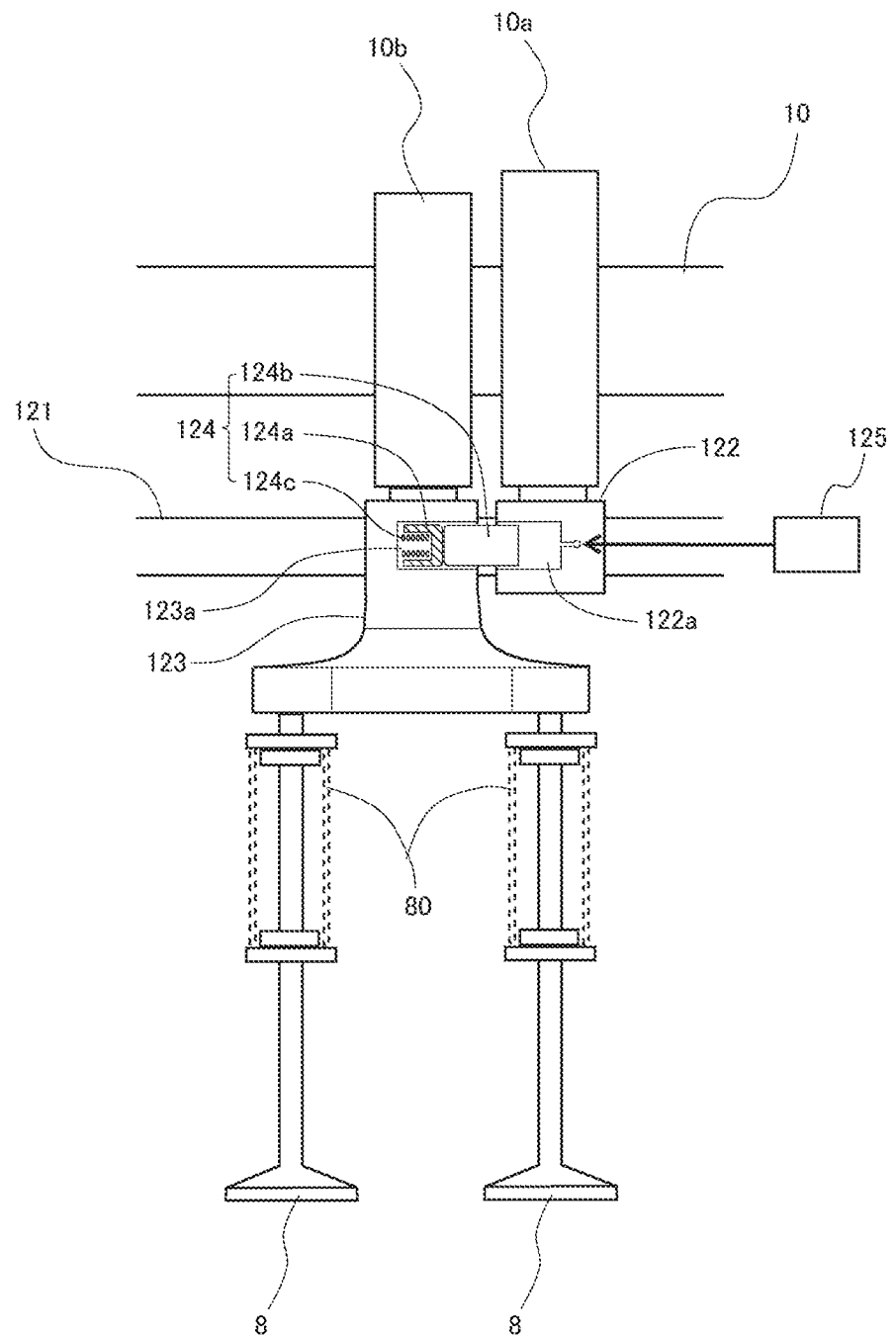

[Fig. 4(a)]

|  | #1 CYLINDER | #2 CYLINDER | #3 CYLINDER | #4 CYLINDER | #5 CYLINDER | #6 CYLINDER |
|---|---|---|---|---|---|---|
| 1st CYCLE | × | ○ | ○ | × | ○ | ○ |
| 2nd CYCLE | ○ | × | ○ | ○ | × | ○ |
| 3rd CYCLE | ○ | ○ | × | ○ | ○ | × |
| 4th CYCLE | × | ○ | ○ | × | ○ | ○ |
| 5th CYCLE | ○ | × | ○ | ○ | × | ○ |
| 6th CYCLE | ○ | ○ | × | ○ | ○ | × |
| 7th CYCLE | × | ○ | ○ | × | ○ | ○ |
| 8th CYCLE | ○ | × | ○ | ○ | × | ○ |
| 9th CYCLE | ○ | ○ | × | ○ | ○ | × |
| 10th CYCLE | × | ○ | ○ | × | ○ | ○ |
| ⋮ | ⋮ | ⋮ | ⋮ | ⋮ | ⋮ | ⋮ |

[Fig. 4(b)]

| | #1 CYLINDER | #2 CYLINDER | #3 CYLINDER | #4 CYLINDER | #5 CYLINDER | #6 CYLINDER |
|---|---|---|---|---|---|---|
| 1st CYCLE | × | ○ | × | ○ | × | ○ |
| 2nd CYCLE | ○ | × | ○ | × | ○ | × |
| 3rd CYCLE | × | ○ | × | ○ | × | ○ |
| 4th CYCLE | ○ | × | ○ | × | ○ | × |
| 5th CYCLE | × | ○ | × | ○ | × | ○ |
| 6th CYCLE | ○ | × | ○ | × | ○ | × |
| 7th CYCLE | × | ○ | × | ○ | × | ○ |
| 8th CYCLE | ○ | × | ○ | × | ○ | × |
| 9th CYCLE | × | ○ | × | ○ | × | ○ |
| 10th CYCLE | ○ | × | ○ | × | ○ | × |
| ⋮ | ⋮ | ⋮ | ⋮ | ⋮ | ⋮ | ⋮ |

[Fig. 5]
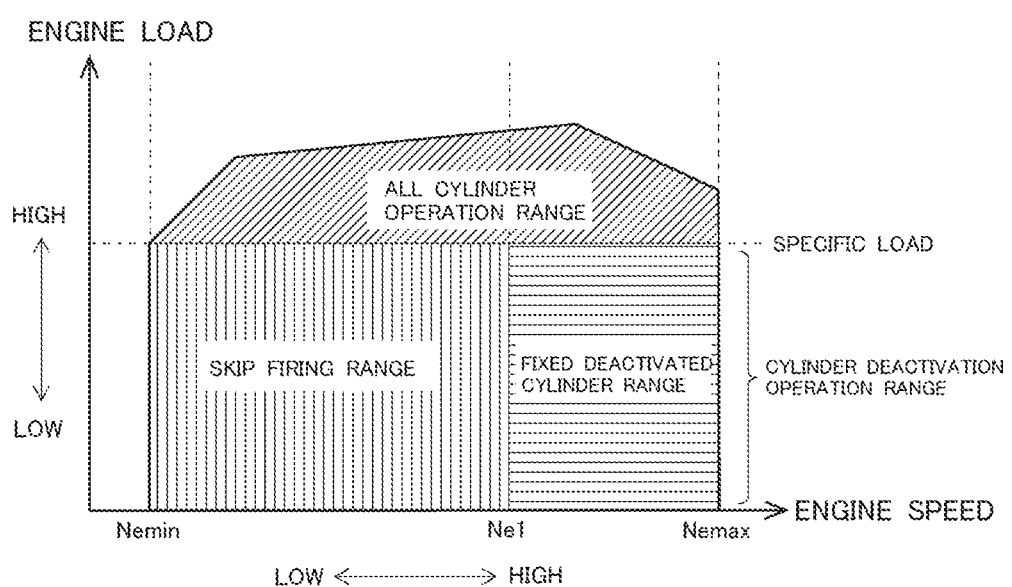

[Fig. 6]
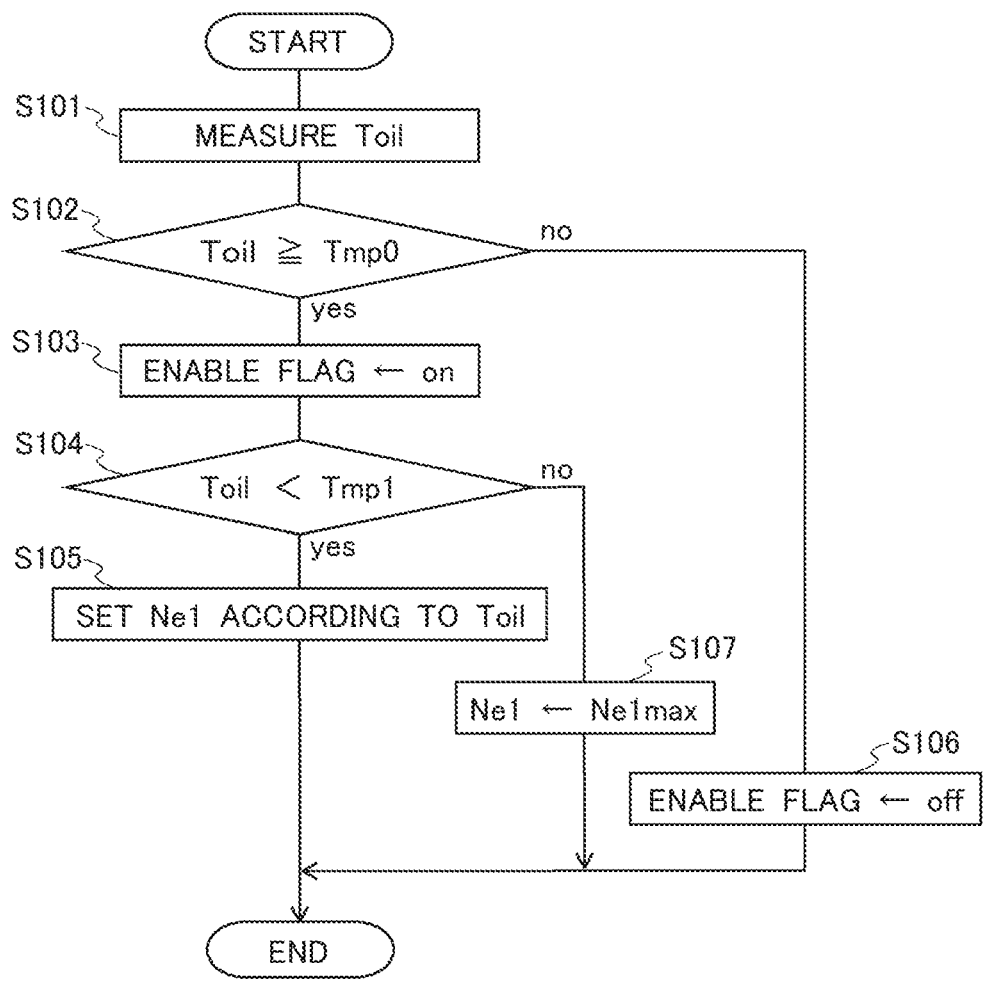

[Fig. 7]
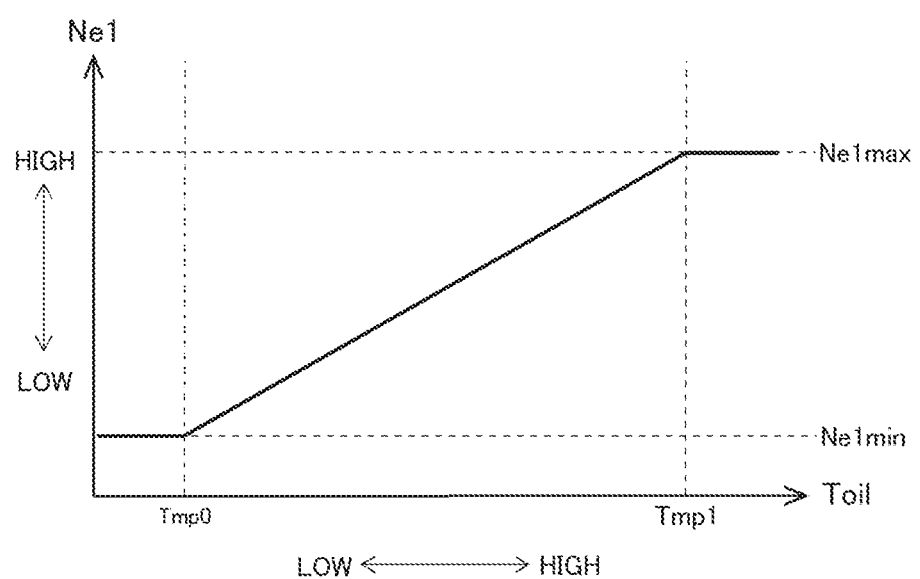

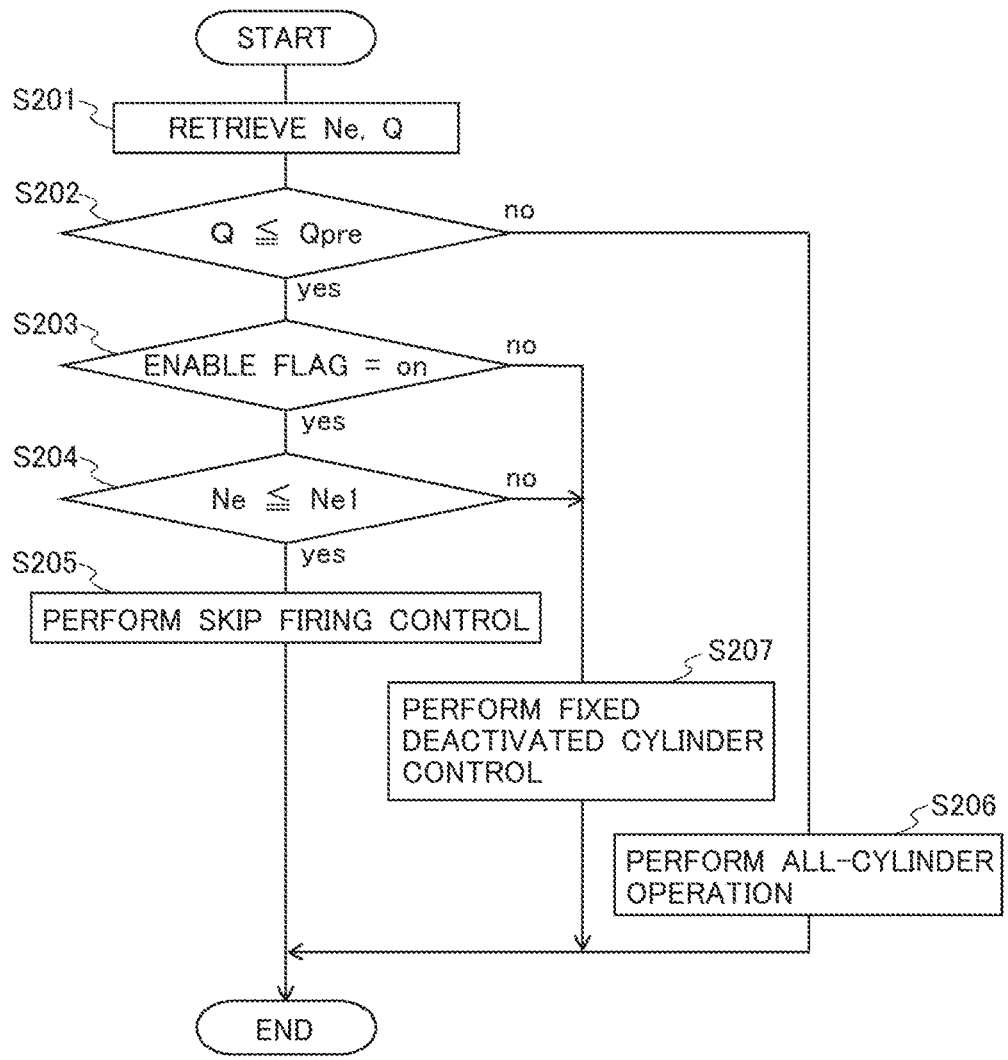
[Fig. 8]

[Fig. 9]
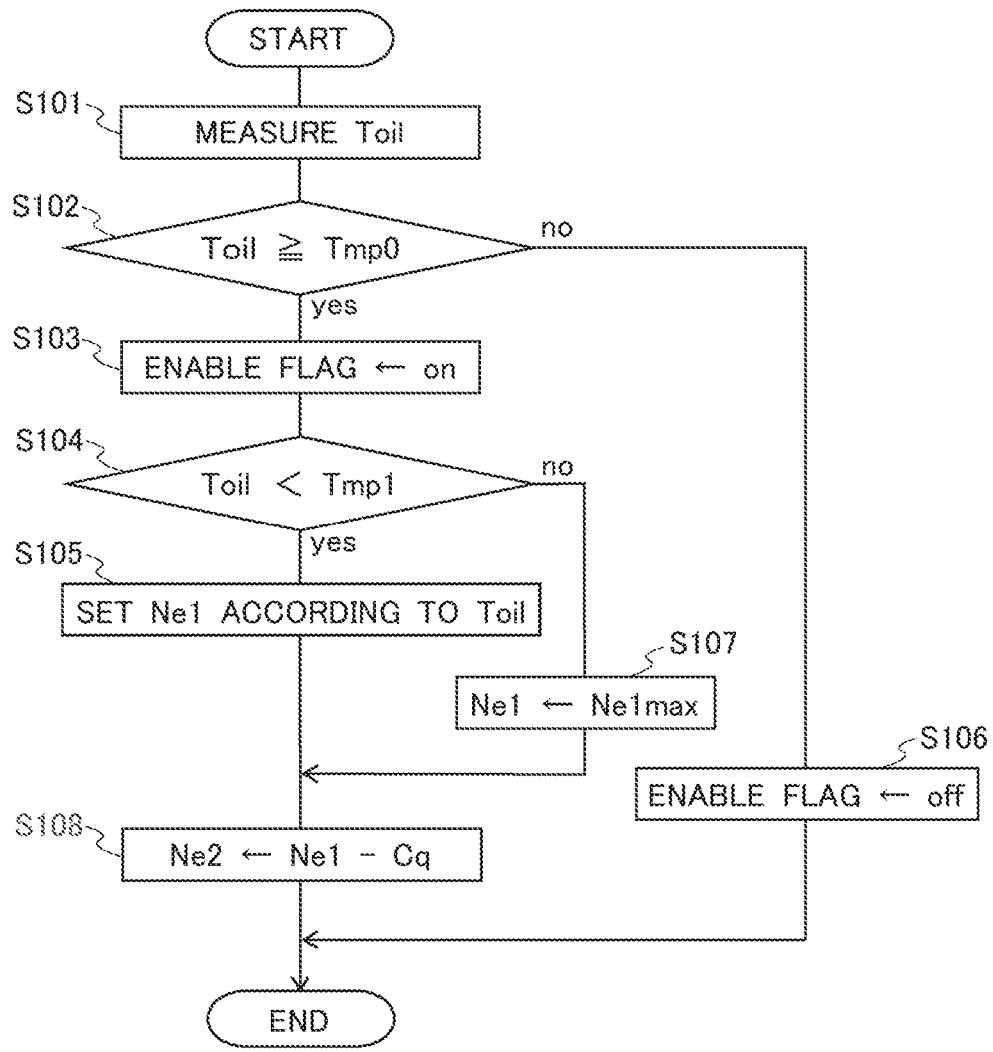

[Fig. 10]
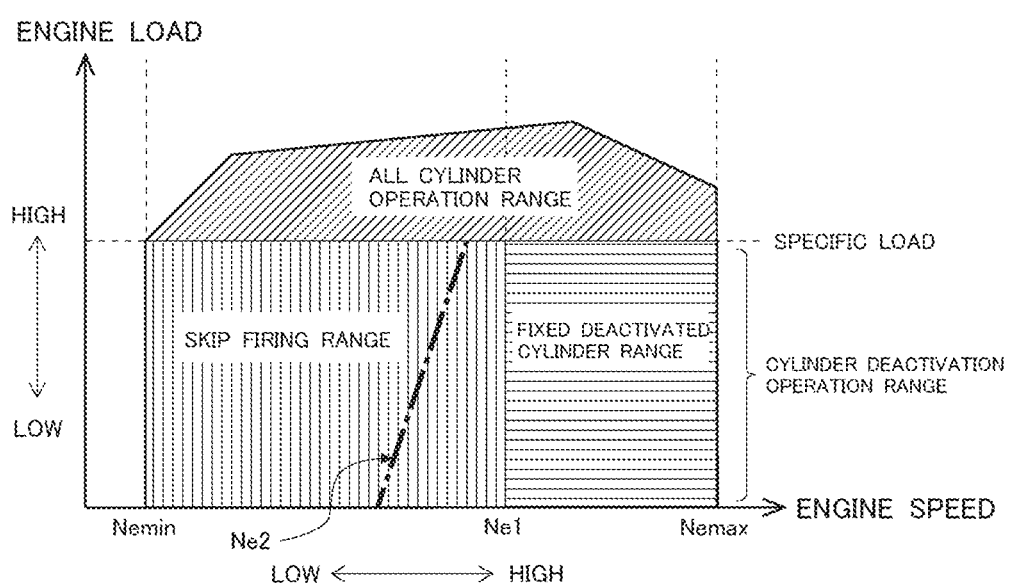

[Fig. 11]
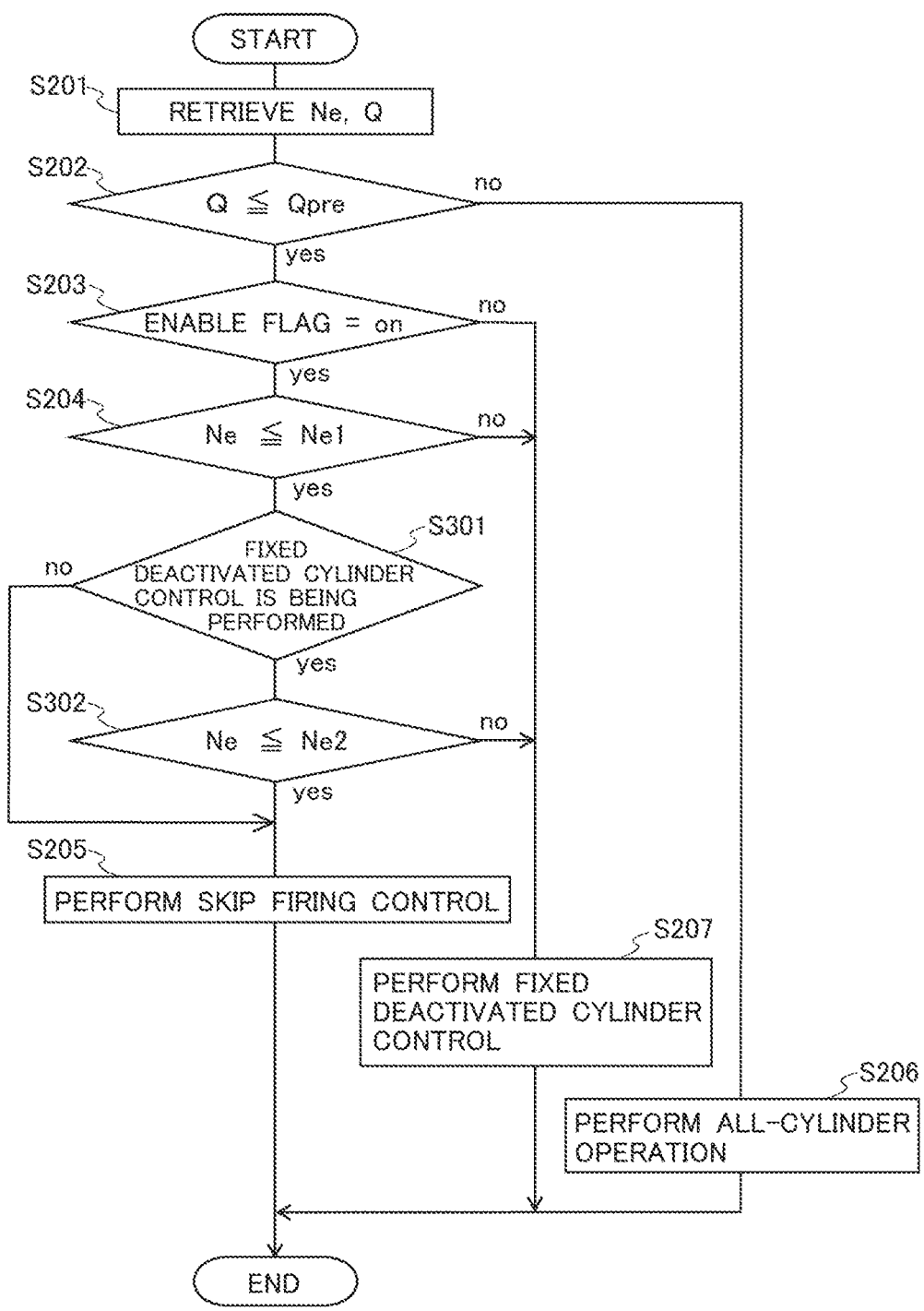

[Fig. 12]
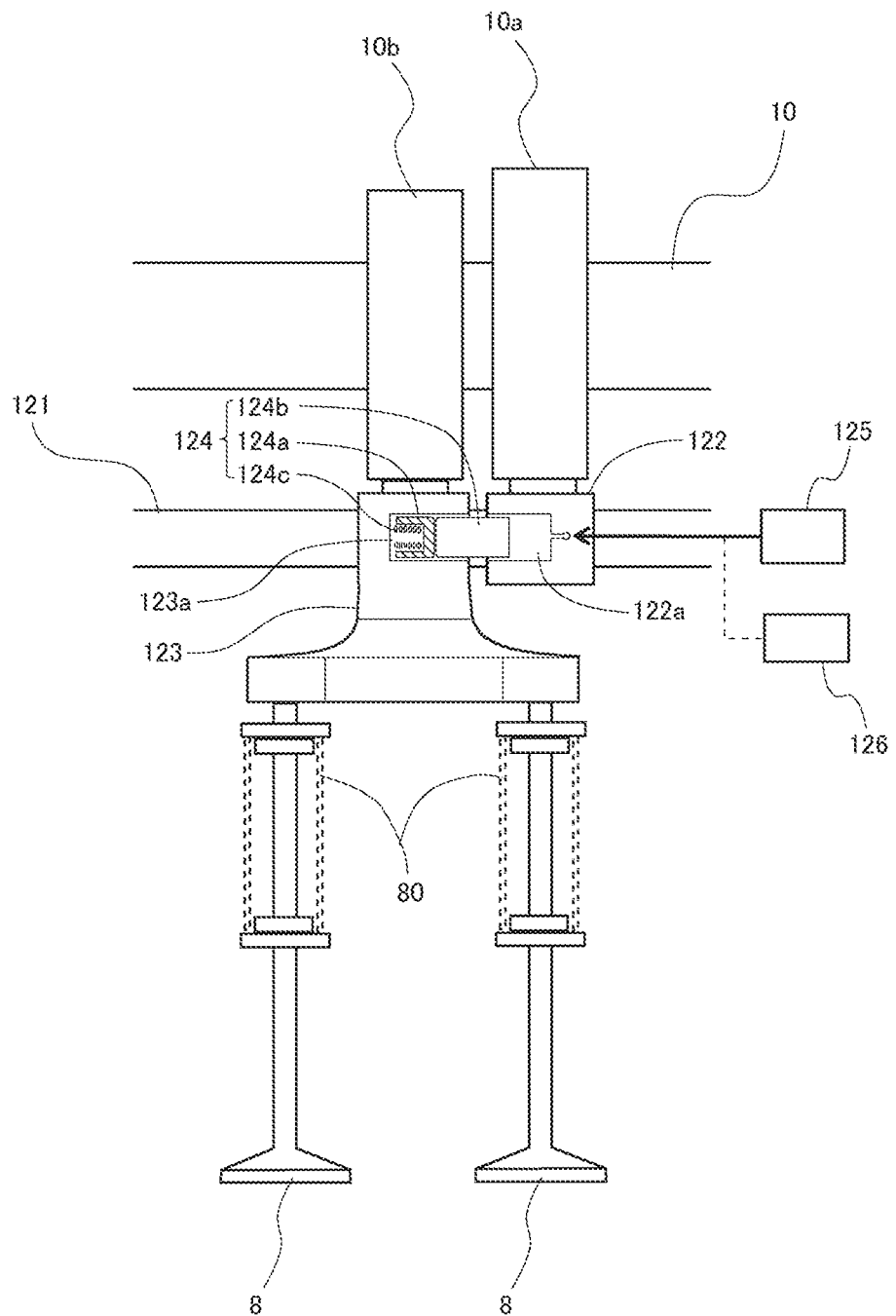

[Fig. 13]
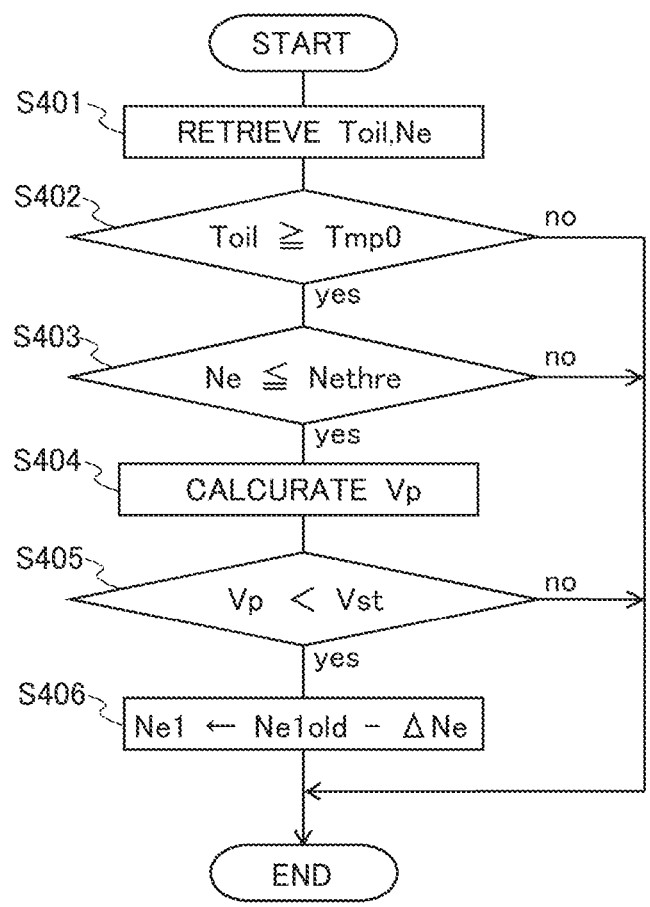

CONTROL APPARATUS FOR INTERNAL COMBUSTION ENGINE

CROSS-REFERENCE TO RELATED APPLICATIONS

This application claims the benefit of Japanese Patent Application No. 2017-99823, filed on May 19, 2017, which is hereby incorporated by reference herein in its entirety.

BACKGROUND

Technical Field

The present disclosure relates to a control apparatus for an internal combustion engine capable of performing cylinder deactivation, which is the operation of deactivating some cylinders among a plurality of cylinders.

Description of the Related Art

It is known to improve the thermal efficiency of internal combustion engines equipped with a plurality of cylinders by performing the operation of deactivating some of the cylinders when the engine load is relatively low (cylinder deactivation). When cylinder deactivation is performed in an internal combustion engine, combustion in the cylinders to be deactivated is stopped, and the mode of operation of the intake and exhaust valves of the cylinders to be deactivated is switched from an active mode (in which the operation of opening/closing the intake and exhaust valves is enabled) to an inactive mode (in which the operation of opening/closing the intake and exhaust valves is disabled) by a variable valve actuation system to thereby reduce the mechanical losses and the intake and exhaust losses resulting from the operation of opening/closing the intake and exhaust valves.

If the deactivated cylinders in an internal combustion engine that performs the above-described cylinder deactivation are fixed to specific cylinders, the difference in the condition in the specific cylinders in the deactivated state and the other cylinders in the active state tends to be relatively large. Then, when the specific cylinders shift from inactive to active, there can arise a difference between the combustion state in the specific cylinders and the combustion state of the other cylinders. This can lead to increases in harmful exhaust emissions. To address this problem, there has been developed the control method of changing the deactivated cylinders when performing cylinder deactivation in an internal combustion engine (see, for example, Patent Literature 1). This control will be referred to as the "skip firing control" hereinafter.

CITATION LIST

Patent Literature

Patent Literature 1: Japanese Patent Application Laid-Open No. 2014-532145

SUMMARY

When changing the deactivated cylinders, it is necessary for the aforementioned skip firing control to activate in the next cycle the cylinders that are deactivated in the present cycle and to deactivate in the next cycle the cylinders that are active in the present cycle. In doing so, it is necessary to carry out the mode switching by the variable valve actuation system in a period in which the mode switching does not affect the operation of opening/closing the intake and exhaust valves during the period from the end of the intake stroke (or the exhaust stroke) in the present cycle and the start of the intake stroke (or the exhaust stroke) in the next cycle.

The length of time from the beginning to the end of the aforementioned period in which the mode switching does not affect the operation of opening/closing the intake and exhaust valves decreases with increasing engine speed. This length of time will be hereinafter referred to as the "switchable time". When the engine speed is somewhat high, the aforementioned switchable time can be shorter than the time taken for the variable valve actuation system to carry out the mode switching operation (which will be hereinafter referred to as the "mode switching time"). If the skip firing control is performed in the operation range in which the switchable time is shorter than the mode switching time, increases in harmful exhaust emissions and/or misfire can occur in the next and subsequent cycles because of difficulty in completing the mode switching operation by the variable valve actuation system within the aforementioned switchable time.

The present disclosure has been made in view of the above-described circumstances, and an object of the present disclosure is to prevent increases in harmful exhaust emissions and misfire from being caused by skip firing control in internal combustion engines capable of performing cylinder deactivation.

To solve the above problem, according to the present disclosure that pertains to an internal combustion engine fitted with cylinder deactivation, the skip firing control is performed in the operation range in which the switchable time is equal to or longer than the mode switching time and not performed in the operation range in which the switchable time is shorter than the mode switching time.

More specifically, according to the present disclosure there is provided a control apparatus applied to an internal combustion engine equipped with a plurality of cylinders, a variable valve actuation system capable of switching the operation mode of intake and exhaust valves of each of the cylinders between an inactive mode in which the operation of opening/closing the intake and exhaust valves of the cylinder is disabled and an active mode in which the operation of opening/closing the intake and exhaust valves of the cylinder is enabled on a cylinder-by-cylinder basis, and a fuel injection valve that supplies fuel into each of the cylinders of the internal combustion engine. The control apparatus includes a controller capable of performing skip firing control, which is the control of deactivating some of the cylinders by causing said variable valve actuation system to set the operation mode of the intake and exhaust valves of the some of the cylinders in said internal combustion engine to the inactive mode and causing the fuel injection valve of the some of the cylinders to suspend supply of fuel and changing the deactivated cylinders. Said controller performs said skip firing control when the engine speed is equal to or lower than a first engine speed and does not perform said skip firing control when the engine speed is higher than said first engine speed.

The first engine speed mentioned above is an engine speed above which the aforementioned switchable time is shorter than the mode switching time or such an engine speed minus a certain margin.

The above-described control apparatus for an internal combustion engine performs the skip firing control when the engine speed is equal to or lower than the first engine speed.

When the engine speed is equal to or lower than the first engine speed, the aforementioned switchable time is equal to or longer than the mode switching time, and it is possible to complete the mode switching operation by the variable valve actuation system within the switchable time. Therefore, if the skip firing control is performed when the engine speed is equal to or lower than the first engine speed, the deactivated cylinders can be changed without causing increases in harmful exhaust emissions or misfire. Moreover, the above-described control apparatus for an internal combustion engine does not perform the skip firing control when the engine speed is higher than the first engine speed. When the engine speed is higher than the first engine speed, the aforementioned switchable time is shorter than the mode switching time, and therefore it is difficult to complete the mode switching operation by the variable valve actuation system within the switchable time. Therefore, if the skip firing control is not performed when the engine speed is higher than the first engine speed, increases in harmful exhaust emissions and misfire are prevented from being caused by incompletion of the mode switching operation by the variable valve actuation system within the aforementioned switchable time.

When the engine speed is higher than the first engine speed, the control apparatus for an internal combustion engine according to the present disclosure may cause all the cylinders to operate or alternatively continue cylinder deactivation with fixed deactivated cylinders. Thus, when the engine speed is higher than the first engine speed, the controller according to the present disclosure may perform fixed deactivated cylinder control to control said variable valve actuation system and said fuel injection valve in such a way as to deactivate specific cylinders among the plurality of cylinders. It is not necessary for the fixed deactivated cylinder control to complete the mode switching operation by the variable valve actuation system within the aforementioned switchable time. Therefore, cylinder deactivation can be performed in the internal combustion engine in operation ranges in which the aforementioned switchable time is shorter than the mode switching time while preventing increases in harmful exhaust emissions and misfire. Therefore, the thermal efficiency of the internal combustion engine can be enhanced.

In the case where the control apparatus is adapted to switch the control mode from the skip firing control to the fixed deactivated cylinder control at the time when the engine speed becomes higher than the first engine speed, the control apparatus may be adapted to perform the fixed deactivated cylinder control and not to perform the skip firing control until the engine speed decreases to or below a second engine speed lower than said first engine speed after the engine speed has become higher than the first engine speed (namely after the switching from the skip firing control to the fixed deactivated cylinder control). In other words, after the engine speed has become higher than the first engine speed, switching from the fixed deactivated cylinder control to the skip firing control may be disabled until the engine speed decreases to or below the second engine speed. While cylinder deactivation is being performed in the internal combustion engine, the degree of fluctuations of the engine speed tends to be larger than when all the cylinders of the internal combustion engine are operating. For this reason, even in cases where the operation condition of the internal combustion engine is stable with the engine speed close to the first engine speed, there is a possibility that the engine speed may fluctuate about the first engine speed. In such cases, if the threshold of the engine speed at which the fixed deactivated cylinder control is switched to the skip firing control is set at the same value as the first engine speed as the threshold at which the skip firing control is switched to the fixed deactivated cylinder control, there is a possibility that after switching from the skip firing control to the fixed deactivated cylinder control, switching from the fixed deactivated cylinder control to the skip firing control and switching from the skip firing control to the fixed deactivated cylinder control may occur alternately in short intervals, resulting in hunting in control. To avoid this, the threshold of the engine speed at which the fixed deactivated cylinder control is switched to the skip firing control may be set at a second engine speed lower than the first engine speed as the threshold at which the skip firing control is switched to the fixed deactivated cylinder control. Thus, the above-described hunting in control can be prevented from occurring.

To enhance the thermal efficiency of the internal combustion engine as much as possible, it is advantageous to make the number of deactivated cylinders larger when the engine load is low than when the engine load is high when performing the skip firing control or the fixed deactivated cylinder control. In the case where the number of deactivated cylinders is changed depending on the engine load, the degree of fluctuations of the engine speed tends to be larger when the engine load is low than when the engine load is high. Therefore, in the case where the control apparatus is adapted to change the number of deactivated cylinders depending on the engine load, the second engine speed may be set lower when the engine load is low than when the engine load is high. Setting the second engine speed in this way can prevent the above-described hunting in control from occurring even in the case where the number of deactivated cylinders is changed depending on the engine load.

The variable valve actuation system in the internal combustion engine to which the present disclosure is applied may be a solenoid variable valve actuation system or a hydraulic variable valve actuation system. Since the mode switching operation by the variable valve actuation system is performed frequently in the skip firing control, the magnitude of operation noise of the variable valve actuation system tends to be high. In particular, the magnitude of the operation noise of solenoid variable valve actuation systems tends to be higher than that of the hydraulic variable valve actuation systems. Therefore, a hydraulic variable valve actuation system may be employed as the variable valve actuation system of internal combustion engines in which the skip firing control is performed. However, the response speed of hydraulic variable valve actuation systems is lower than that of solenoid variable valve actuation systems in some cases, and lower response speeds can lead to longer mode switching times. Even in the case of internal combustion engines equipped with a hydraulic variable valve actuation system, if the skip firing control is performed when the engine speed is equal to or lower than the first engine speed and not performed when the engine speed is higher than the first engine speed, increases in harmful exhaust emissions and misfire are prevented from being caused by performing the skip firing control.

In the case where the internal combustion engine to which the present disclosure is applied is equipped with a hydraulic variable valve actuation system, the control apparatus may further includes a detector that measures the hydraulic oil temperature, namely the temperature of the hydraulic oil in the variable valve actuation system. When the hydraulic oil temperature measured by said detector is lower than a warming-up completion temperature, the controller may set said first engine speed lower when the hydraulic oil temperature is low than when the hydraulic oil temperature is high. The response speed of the hydraulic variable valve actuation system varies depending on the hydraulic oil temperature. In particular, when the hydraulic oil temperature is lower than the warming-up completion temperature, the response speed of the hydraulic variable valve actuation system is apt to vary depending on the hydraulic oil temperature. Specifically, when the hydraulic oil temperature is lower than the warming-up completion temperature, the response speed of the hydraulic variable valve actuation system tends to be lower, and the mode switching time tends to be longer according, when the hydraulic oil temperature is low than when it is high. In view of this, when the hydraulic oil temperature is lower than the warming-up completion temperature, the first engine speed may be set lower when the hydraulic oil temperature is low than when it is high. This can prevent the skip firing control from being performed in the operation range in which the switchable time is shorter than the mode switching time with improved reliability.

In the case where the internal combustion engine to which the present disclosure is applied is equipped with a hydraulic variable valve actuation system, if the hydraulic oil is deteriorated over time, the response speed of the variable valve actuation system may decrease accordingly. Then, the mode switching time of the variable valve actuation system may become longer than a presumed time. To avoid this, the control apparatus according to the present disclosure may further include an acquirer that acquires the rate of change of the pressure of hydraulic oil when switching between the inactive mode and the active mode is being performed by said variable valve actuation system. If the rate of change acquired by said acquirer is lower than a specific criterion value when the engine speed is lower than a specific threshold lower than said first engine speed, said controller may correct said first engine speed to a lower engine speed. The specific threshold mentioned above is an engine speed that is sufficiently lower than the first engine speed before correction and at which it is supposed that the switchable time will not become shorter than the mode switching time even if the hydraulic oil is deteriorated over time. The specific criterion value mentioned above is a value of the rate of change of the hydraulic oil pressure below which the mode switching time is supposed to become longer than a presumed time. The above feature can prevent, with improved reliability, the skip firing control from being performed in the operation range in which the switchable time is shorter than the mode switching time, even if the hydraulic oil is deteriorated over time. In the above-described case, the acquisition of the rate of change of the pressure of the hydraulic oil and the correction of the first engine speed are performed when the engine speed is sufficiently lower than the first engine speed. This is because if the acquisition and correction are performed when the engine speed is close to the first engine speed, there is a possibility that the switchable time may become shorter than the mode switching time before the first engine speed is corrected, leading to increases in harmful exhaust emissions and/or misfire.

The present disclosure can prevent increases in harmful exhaust emissions and misfire from being caused by skip firing control in internal combustion engines capable of performing cylinder deactivation.

BRIEF DESCRIPTION OF DRAWINGS

FIG. 1 is a diagram showing the general configuration of an internal combustion engine to which the present disclosure is applied.

FIG. 2 is a first diagram showing the general configuration of a first variable valve actuation system.

FIG. 3 is a second diagram showing the general configuration of the first variable valve actuation system.

FIG. 4(a) is table showing how the skip firing control is performed in a case where two cylinders are deactivated in one cycle.

FIG. 4(b) is table showing how the skip firing control is performed in a case where three cylinders are deactivated in one cycle.

FIG. 5 is a diagram showing an operation range (skip firing range) in which the skip firing control is performed.

FIG. 6 is a flow chart of a processing routine executed by an ECU to set a first engine speed in a first embodiment.

FIG. 7 is a graph showing relationship between the hydraulic oil temperature Toil and a first engine speed Ne1.

FIG. 8 is a flow chart of a processing routine executed by the ECU when performing cylinder deactivation in the internal combustion engine in the first embodiment.

FIG. 9 is a flow chart of a processing routine executed by the ECU to set the first engine speed and a second engine speed in a second embodiment.

FIG. 10 is a graph showing relationship between the first engine speed Ne1 and the second engine speed Ne2.

FIG. 11 is a flow chart of a processing routine executed by the ECU when performing cylinder deactivation in the internal combustion engine in the second embodiment.

FIG. 12 is a diagram showing the general configuration of a first variable valve actuation system 100 in a third embodiment.

FIG. 13 is a flow chart of a processing routine executed by the ECU to correct the first engine speed in the third embodiment.

DESCRIPTION OF EMBODIMENTS

In the following, specific embodiments of the present disclosure will be described with reference to the drawings. The dimensions, materials, shapes, relative arrangements, and other features of the components that will be described in connection with the embodiments are not intended to limit the technical scope of the present disclosure only to them, unless otherwise stated.

Embodiment 1

A first embodiment of the present will be described with reference to FIGS. 1 to 8. FIG. 1 is a diagram showing the general configuration of an internal combustion engine to which the present disclosure is applied. The internal combustion engine 1 shown in FIG. 1 is a four-stroke spark-ignition internal combustion engine having a plurality of cylinders 2 (e.g. gasoline engine). FIG. 1 shows only one of the plurality of cylinders. The engines to which the present disclosure is to be applied are not limited to spark-ignition internal combustion engines like that shown in FIG. 1, but the present disclosure may also be applied to four-stroke compression-ignition internal combustion engines (e.g. diesel engines).

A piston 3 is provided inside the cylinder 2 of the internal combustion engine 1 in a slidable manner. The piston 3 is connected with a crankshaft 5 by a connecting rod 4. The space inside the cylinder 2 (which constitutes a combustion chamber) is in communication with an intake port 6 and an exhaust port 7. The end of the intake port 6 that open to the cylinder 2 is closed and opened by an intake valve 8. The end of the exhaust port 7 that opens to the cylinder 2 is closed and opened by an exhaust valve 9. The intake valve 8 and the exhaust valve 9 are driven by an intake cam shaft 10 and an exhaust cam shaft 11 respectively for the opening/closing operation.

The intake port 6 is in communication with an intake passage 60. The intake passage 60 is provided with a fuel injection valve 12 that injects fuel toward the intake port 6. The intake passage 60 is a passage through which fresh air is delivered to the intake port 6. The intake air delivered to the intake port 6 is sucked into the cylinder 2 when the intake valve 8 opens. Moreover, fuel injected by the fuel injection valve 12 into the intake port 6 is also sucked into the cylinder 2 with the intake air.

The fuel and intake air (i.e. air-fuel mixture) taken into the cylinder 2 is ignited by an ignition plug 13 attached to each cylinder 2 to burn. The gas burned in the cylinder 2 (burned gas) is discharged to the exhaust port 7 when the exhaust valve 9 opens. The exhaust port 7 is in communication with an exhaust passage 70, and the aforementioned burned gas is emitted to the atmosphere through the exhaust port 7 and the exhaust passage 70.

Each cylinder 2 of the internal combustion engine 1 is provided with a first variable valve actuation system 100 for switching the operation mode of the intake valve 8 between the inactive mode in which the operation of opening/closing the intake valve 8 is disabled and the active mode in which the operation of opening/closing the intake valve 8 is enabled. Each cylinder 2 of the internal combustion engine 1 is further provided with a second variable valve actuation system 110 for switching the operation mode of the exhaust valve 9 between the inactive mode and the active mode. In the following, the structure of the first variable valve actuation system 100 and the second variable valve actuation system 110 will be described with reference to FIGS. 2 and 3. The first variable valve actuation system 100 and the second variable valve actuation system 110 have the same structure, and hence only the first variable valve actuation system 100 will be described in the following.

Structure of the Variable Valve Actuation System

The first variable valve actuation system 100 includes two cams 10a, 10b attached to the intake cam shaft 10, a rocker shaft 121 arranged parallel to the intake cam shaft 10, two rocker arms 122, 123 attached to the rocker shaft 121 in a slidable manner, a lock mechanism 124 for switching between the connection and separation of the two rocker arms 122, 123, and an oil control valve (OCV) 125 for switching between the application and relaxation of hydraulic oil pressure to the lock mechanism 124.

One cam 10a (which will be referred to as the first cam 10a hereinafter) among the two cams 10a, 10b attached to the intake cam shaft 10 has a cam profile with a duration and lift (i.e. the height of the cam nose) larger than zero. The other cam 10b (which will be referred to as the second cam 10b hereinafter) among the two cams 10a, 10b has a cam profile with a duration and lift equal to zero. In other words, the second cam 10b has only the base circle.

One rocker arm 122 (which will be referred to as the first rocker arm 122 hereinafter) among the two rocker arms 122, 123 attached to the rocker shaft 121 is pressed against the first cam 10a by the effect of a coil spring or lash adjuster not shown in the drawings and rocked by the cam nose of the first cam 10a. The other rocker arm 123 (which will be referred to as the second rocker arm 123) among the two rocker arms 122, 123 has an end to which the base end of the intake valve 8 (i.e. the base end of the valve stem) abuts. The second rocker arm 123 is pressed against the second cam 10b by the effect of the valve spring 80 of the intake valve 8 and a coil spring or lash adjuster not shown in the drawings.

The lock mechanism 124 includes a separation pin 124a, a lock pin 124b, and a separating spring 124c. The separation pin 124a is received in a first pin bore 123a provided in the second rocker arm 123 in a slidable manner. The first pin bore 123a is provided on the surface of the second rocker arm 123 that faces the first rocker arm 122. The axis of the first pin bore 123a is parallel to the axis of the rocker shaft 121. The separating spring 124c is set on the bottom of the first pin bore 123a to bias the separation pin 124a in the direction toward the first rocker arm 122. The lock pin 124b is received in a second pin bore 122a provided in the first rocker arm 122 in a slidable manner. The position of the second pin bore 122a in the first rocker arm 122 is designed in such a way that the second pin bore 122a is opposed to the first pin bore 123a when the first rocker arm 122 abuts to the base circle of the first cam 10a. The axis of the second pin bore 122a is parallel to the axis of the rocker shaft 121.

The separating pin 124a, the lock pin 124b, the second pin bore 122a, and the first pin bore 123a are dimensioned in such a way as to satisfy the following two conditions. The first condition is that when the base end (right end in FIG. 2) of the lock pin 124b abuts to the bottom of the second pin bore 122a, the top end (left end in FIG. 2) of the lock pin 124b and the top end (right end in FIG. 2) of the separation pin 124a are located in a gap between the first rocker arm 122 and the second rocker arm 123, as shown in FIG. 2. The second condition is that when the base end (left end in FIG. 2) of the separation pin 124a abuts the bottom of the first pin bore 123a, the top end of the lock pin 124b and the top end of the separation pin 124a are located in the first pin bore 123a and the base end of the lock pin 124b is located in the second pin bore 122a, as shown in FIG. 3.

There is a space in the second pin bore 122a between the base end of the lock pin 124b and the bottom of the second pin bore 122a. This space will be hereinafter referred to as the operation chamber. The OCV 125 selectively establishes a state in which the hydraulic oil pressure is applied to the operation space and a state in which the hydraulic oil pressure in the operation chamber is relaxed.

In the first variable valve actuation system 100 structured as above, when the OCV 125 relaxes the hydraulic oil pressure in the operation chamber, the biasing force of the separating spring 124c is greater than the hydraulic oil pressure in the operation chamber, so that the separation pin 124a and the lock pin 124b are pushed in the direction from the second rocker arm 123 to the first rocker arm 122. In consequence, the base end of the lock pin 124b abuts the bottom of the second pin bore 122a. In other words, the state shown in FIG. 2 is established, in which the top end of the separation pin 124a and the top end of the lock pin 124b are located in the gap between first rocker arm 122 and the second rocker arm 123. In this state, the first rocker arm 122 and the second rocker arm 123 are separated. Thus, when the first rocker arm 122 is rocked by the cam nose of the first cam 10a, the motion of the first rocker arm 122 is not transmitted to the second rocker arm 123. In consequence, the motion of the second rocker arm 123 follows the cam profile of the second cam 10b. In this embodiment, the second cam 10b has a cam profile that makes the duration and the lift equal to zero as described above. Therefore, when the first rocker arm 122 and the second rocker arm 123 are in the separated state, the second rocker arm 123 does not rock. In consequence, the operation of opening/closing the intake valve 8 is disabled (inactive mode).

On the other hand, when the OCV 125 is applying the hydraulic oil pressure to the operation chamber in the first variable valve actuation system 100 structured as above, the hydraulic oil pressure in the operation chamber is greater than the biasing force of the separating spring 124c, so that the separation pin 124a and the lock pin 124b are pushed in the direction from the first rocker arm 122 to the second rocker arm 123. In consequence, the base end of the separation pin 124a abuts the bottom of the first pin bore 123a. In other words, the state shown in FIG. 3 is established, in which the top end of the lock pin 124b and the top end of the separation pin 124a are located in the first pin bore 123a and the base end of the lock pin 124b is located in the second pin bore 122a. In this state, the first rocker arm 122 and the second rocker arm 123 are linked by the lock pin 124b. Thus, when the first rocker arm 122 is rocked by the cam nose of the first cam 10a, the motion of the first rocker arm 122 is transmitted to the second rocker arm 123. Therefore, when the first rocker arm 122 and the second rocker arm 123 are in the linked state, the second rocker arm 123 rocks following the cam profile of the first cam 10a. In consequence, the intake valve 8 is opened and closed (active mode).

The above-described first variable valve actuation system 100 (and the second variable valve actuation system 110) constitutes the variable valve actuation system according to the present disclosure. The structure shown in FIGS. 2 and 3 is an illustrative example of the variable valve actuation system according to the present disclosure, and the structure shown in FIGS. 2 and 3 is not intended to limit the variable valve actuation system according to the present disclosure.

Referring back to FIG. 1, an ECU 14 is provided for the internal combustion engine 1. The ECU 14 is an electronic control unit composed of a CPU, a ROM, a RAM, and a backup RAM etc. The ECU 14 is electrically connected with various sensors such as a crank position sensor 15, a water temperature sensor 16, and an accelerator position sensor 17. The crank position sensor 15 is a sensor that outputs an electrical signal representing the rotational position of the crankshaft 5. The water temperature sensor 16 is a sensor that outputs an electrical signal representing the temperature of cooling water circulating in the internal combustion engine 1. The accelerator position sensor 17 is a sensor that outputs an electrical signal representing the amount of operation of the accelerator pedal (or the accelerator opening degree).

The ECU 14 is also electrically connected with various components such as the fuel injection valve 12, the ignition plug 13, the first variable valve actuation system 100, and the second variable valve actuation system 110. The ECU 14 controls the aforementioned components on the basis of the output signals of the aforementioned sensors. For example, the ECU 14 determines the fuel injection quantity, fuel injection timing and the ignition timing on the basis of the engine speed calculated from the output signal of the crank position sensor 15 and the engine load calculated from the output signal of the accelerator position sensor 17 and controls the fuel injection valve 12 and the ignition plug 13 in accordance with the determined particulars. In this embodiment, the ECU 14 performs the control of deactivating some of the cylinders 2 of the internal combustion engine 1 and changing the deactivated cylinders 2 (skip firing control) besides the aforementioned known controls to cause the internal combustion engine 1 to operate in the cylinder deactivation mode. In the following, how the skip firing control is performed will be described.

(Outline of Skip Firing Control)

The skip firing control is the control of deactivating some of the cylinders 2 in the operation range in which the engine load is lower than a specific load (which will be referred to as the cylinder deactivation operation range) by suspending the operation of the fuel injection valve 12 and the ignition plug 13 of some of the cylinders 2 of the internal combustion engine 1 and setting the mode of operation of the intake and exhaust valves 8, 9 of those cylinders 2 to the inactive mode. The number of cylinders deactivated in the skip firing control is varied according to the engine load. Specifically, the number of deactivated cylinders is larger when the engine load is low than when the engine load is high. Changing the deactivated cylinders by the skip firing control reduces variations in the conditions, such as the temperature, inside the cylinders.

How the skip firing control is performed will be described with reference to the tables in FIGS. 4(a) and 4(b). The tables in FIGS. 4(a) and 4(b) show the active state and the deactivated state of the respective cylinders in an internal combustion engine having six cylinders. The table in FIG. 4(a) shows a case where two cylinders are deactivated in one cycle, and the table in FIG. 4(b) shows a case where three cylinders are deactivated in one cycle. In the tables in FIGS. 4(a) and 4(b), circles indicate the active state, and crosses indicate the deactivated state.

In the case of the table in FIG. 4(a), each cylinder is deactivated once every three cycles, and the deactivated cylinders are changed in every cycle. For example, in the first three cycles or the first to third cycles, the #1 cylinder and the #4 cylinder are firstly deactivated in the first cycle, then the #2 cylinder and the #5 cylinder are deactivated in the second cycle, and then the #3 cylinder and the #6 cylinder are deactivated in the third cycle. Then, in the next cycle or the fourth cycle, the #1 cylinder and the #4 cylinder are deactivated again. Performing such sequential deactivation repeatedly can uniformize the condition in the cylinders while deactivating two cylinders in every cycle.

In the case shown in the table in FIG. 4(b), each cylinder is deactivated once in every two cycles, and the deactivated cylinders are changed in every cycle. For example, in the first two cycles or the first and second cycles, the #1 cylinder, the #3 cylinder and the #5 cylinder are firstly deactivated in the first cycle, and then the #2 cylinder, the #4 cylinder, and the #6 cylinder are deactivated in the second cycle. Then, in the next cycle or the third cycle, the #1 cylinder, the #3 cylinder and the #5 cylinder are deactivated again. Performing such sequential deactivation repeatedly can uniformize the condition in the cylinders while deactivating three cylinders in every cycle. The skip firing control according to the table in FIG. 4(b) is performed when the engine load is lower than that in the case where the skip firing control is performed according to the table in FIG. 4(a).

The sequences shown in the tables in FIGS. 4(a) and 4(b) are examples of the skip firing control. The cylinders to be deactivated in each cycle and the number of cylinders deactivated in each cycle may be changed appropriately taking account of the firing order of the cylinders, vibrations of the cylinders, and noises.

When the skip firing control is performed by the above-described sequences, it is necessary to activate in the next cycle the cylinders that are deactivated in the present cycle and to deactivate in the next cycle the cylinders that are active in the present cycle. For example, in the case shown in the table in FIG. 4(a), it is necessary to activate in the second cycle the #1 and #4 cylinders, which are deactivated in the first cycle and to deactivate in the second cycle the #2 and #5 cylinders, which are active in the first cycle. In other words, it is necessary to perform the mode switching by the first variable valve actuation system 100 (the second variable valve actuation system 110) in a period in which the mode switching does not affect the operation of opening/closing the intake and exhaust valves 8, 9 during the period from the end of the intake stroke (the exhaust stroke) in the present cycle and the start of the intake stroke (the exhaust stroke) in the next cycle.

The length of time from the beginning to the end of the aforementioned period in which the mode switching does not affect the operation of opening/closing the intake and exhaust valves 8, 9 (or the switchable time) changes depending on the engine speed. More specifically, the switchable time decreases with increasing engine speed. When the engine speed is somewhat high, the switchable time can be shorter than the time taken for the first variable valve actuation system 100 (the second variable valve actuation system 110) to carry out the mode switching (mode switching time). If the skip firing control is performed when the switchable time is shorter than the mode switching time, increases in harmful exhaust emissions and/or misfire can occur in the next and subsequent cycles because of difficulty in completing the mode switching operation by the first variable valve actuation system 100 (the second variable valve actuation system 110) within the aforementioned switchable time.

In this embodiment, as shown in FIG. 5, the skip firing control is performed in the operation range in which the engine speed is equal to or lower than a first engine speed Ne1 (skip firing range) in the cylinder deactivation operation range in which the engine load is lower than the specific load, but the skip firing control is not performed in the operation range in which the engine speed is higher than the first engine speed Ne1 (fixed deactivated cylinder range) in the cylinder deactivation operation range. The first engine speed Ne1 mentioned above is an engine speed above which the switchable time is shorter than the mode switching time or such an engine speed minus a certain margin. In FIG. 5, Nemin is the minimum allowable engine speed of the internal combustion engine 1 (e.g. idle engine speed), and Nemax is the maximum allowable engine speed of the internal combustion engine 1.

As the skip firing range is set as above, the skip firing control is not performed in the operation range in which the switchable time is supposed to be shorter than the mode switching time (fixed deactivated cylinder range) in the cylinder deactivation operation range. In this embodiment, a fixed deactivated cylinder control is performed instead of the skip firing control in the aforementioned fixed deactivated cylinder range. The fixed deactivated cylinder control is the process of controlling the fuel injection valve 12, the ignition plug 13, the first variable valve actuation system 100, and the second variable valve actuation system 110 in such a way as to deactivate specific cylinders among the plurality of cylinders 2 of the internal combustion engine 1. It is not necessary for the fixed deactivated cylinder control to complete the mode switching operation by the first variable valve actuation system 100 (the second variable valve actuation system 110) within a limited time like the aforementioned switchable time. For example, in the case where the state of a specific cylinder is to be changed from the active state to the deactivated state, the fuel injection valve 12 and the ignition plug 13 of the specific cylinder are stopped operating, and the first variable valve actuation system 100 (the second variable valve actuation system 110) is controlled in such a way as to switch the mode of operation of the intake and exhaust valves 8, 9 from the active mode to the inactive mode. In that case, the combustion of fuel in the specific cylinder can be ceased, although there is a possibility that the mode switching operation by the first variable valve actuation system 100 (the second variable valve actuation system 110) may not be completed within the switchable time. On the other hand, in the case where the state of a specific cylinder is to be changed from the deactivated state to the active state, the first variable valve actuation system 100 (the second variable valve actuation system 110) is firstly controlled in such a way as to switch the mode of operation of the intake and exhaust valves 8, 9 of the specific cylinder from the inactive mode to the active mode. After the completion of the mode switching operation by the first variable valve actuation system 100 (the second variable valve actuation system 110), in other words, for example, after the lapse of the mode switching time from the start of the mode switching control of the first variable valve actuation system 100 (the second variable valve actuation system 110), the operation of the fuel injection valve 12 and the ignition plug 13 is restarted.

If the fixed deactivated cylinder control is performed instead of the skip firing control in the fixed deactivated cylinder range as described above, cylinder deactivation can be performed in the internal combustion engine 1 while preventing increases in harmful exhaust emissions and misfire from being caused by the incompletion of the mode switching operation by the first variable valve actuation system 100 (the second variable valve actuation system 110) within the switchable time.

(Method of Setting the First Engine Speed)

A method of setting the aforementioned first engine speed Ne1 will be described with reference to FIGS. 6 and 7. FIG. 6 is a flow chart of a processing routine executed by the ECU 14 to set the first engine speed Ne1. This processing routine is stored in the ROM of the ECU 14 and executed repeatedly during the operation of the internal combustion engine 1. FIG. 7 is a graph showing relationship between the temperature Toil of the hydraulic oil in the first variable valve actuation system 100 (the second variable valve actuation system 110) and the first engine speed Ne1.

In the processing routine shown in FIG. 6, firstly in step S101, the ECU 14 determines the temperature Toil of the hydraulic oil in the first variable valve actuation system 100 (the second variable valve actuation system 110). In this embodiment, the temperature Toil of the hydraulic oil is calculated from the output signal of the water temperature sensor 16 (cooling water temperature). Relationship between the cooling water temperature and the hydraulic oil temperature Toil may be determined in advance by, for example, experiment or simulation. Alternatively, an oil temperature sensor may be provided in the channel of the hydraulic oil in the first variable valve actuation system 100 (the second variable valve actuation system 110), and the output signal of the oil temperature sensor may be used as the hydraulic oil temperature Toil. The ECU 14 embodies the detector according to the present disclosure in executing the processing of step S101.

In the processing of step S102, the ECU 14 determines whether or not the hydraulic oil temperature Toil determined in the processing of step S102 is equal to or higher than a lower limit temperature Tmp0. The lower limit temperature Tmp0 is a value of the hydraulic oil temperature below which it may be concluded that it is difficult to perform the skip firing control at any allowable engine speed of the internal combustion engine 1. In other words, the lower limit temperature Tmp0 (e.g. −10° C.) is a value of the hydraulic oil temperature Toil below which the switchable time can be shorter than the mode switching time even when the engine speed is at a specific lower limit Ne1min (idle engine speed).

If an affirmative determination is made in step S102, the ECU 14 executes the processing of step S103 next, where the ECU 14 sets the enable flag to ON. The enable flag is a flag that is set to ON when the hydraulic oil temperature Toil is in the temperature range in which the skip firing control may be performed (namely when the hydraulic oil temperature Toil is equal to or higher than the aforementioned lower limit temperature Tmp0) and set to off when the hydraulic oil temperature Toil is not in the temperature range in which the skip firing control may be performed (namely when the hydraulic oil temperature is lower than the aforementioned lower limit temperature Tmp0). After the completion of the processing of step S103, the ECU 14 executes the processing of step S104 next.

In the processing of step S104, the ECU 14 determines whether or not the hydraulic oil temperature Toil determined in the processing of step S101 is lower than a warming-up completion temperature Tmp1. The warming-up completion temperature Tmp1 mentioned above is a value of the hydraulic oil temperature Toil at or above which the mode switching time is substantially stable at a certain time and below which the mode switching time is supposed to vary depending on the hydraulic oil temperature Toil.

If an affirmative determination is made in step S104 (Toil<Tmp1), it may be presumed that the mode switching time varies depending on the hydraulic oil temperature Toil. Therefore, if an affirmative determination is made in step S104, then in step S105 the ECU 14 sets the first engine speed Ne1 using the hydraulic oil temperature Toil determined in step S101 as a parameter. When the hydraulic oil temperature Toil is in the temperature range equal to or higher than the aforementioned lower limit temperature Tmp0 and lower than the aforementioned warming-up completion temperature Tmp1, the mode switching time of the first variable valve actuation system 100 (the second variable valve actuation system 110) increases with decreasing hydraulic oil temperature Toil. Therefore, in this embodiment, when the hydraulic oil temperature Toil is in the temperature range equal to or higher than the aforementioned lower limit temperature Tmp0 and lower than the aforementioned warming-up completion temperature Tmp1, the lower the hydraulic oil temperature Toil is, the lower the first engine speed Ne1 is set, as shown in FIG. 7.

If a negative determination is made in step S102 (Toil<Tmp0), it may be presumed that it is difficult to perform the skip firing control at any allowable engine speed of the internal combustion engine 1. Therefore, if a negative determination is made in step S102, then in step S106, the ECU 14 sets the enable flag to OFF.

If a negative determination is made in step S104 (Toil≥Tmp1), it may be presumed that warming-up of the first variable valve actuation system 100 (the second variable valve actuation system 110) has been completed and the mode switching time is substantially stable at a certain time, as described above. Therefore, if a negative determination is made in step S104, the ECU 14 executes the processing of step S107 next. In step S107, the ECU 14 fixes the first engine speed Ne1 at a specific upper limit value Ne1max. The specific upper limit value Ne1max mentioned above is a value of the engine speed equal to the engine speed at which the switchable time is equal to the mode switching time in the case where the hydraulic oil temperature Toil is higher than the warming-up completion temperature Tmp1, minus a certain margin.

(Method of Performing Cylinder Deactivation in First Embodiment)

In the following, the procedure of cylinder deactivation in this embodiment will be described with reference to FIG. 8. FIG. 8 is a flow chart of a processing routine executed by the ECU 14 when performing cylinder deactivation in the internal combustion engine 1. This processing routine is stored in the ROM of the ECU 14 and executed repeatedly during the operation of the internal combustion engine 1.

In the processing routine shown in FIG. 8, firstly in step S201, the ECU 14 retrieves the engine speed Ne and the engine Load Q. The engine speed Ne is calculated from the output signal of the crank position sensor 15 by a separate routine and saved in the RAM or the like of the ECU 14. The engine load Q is calculated from the output signal of the accelerator position sensor 17 by a separate routine and saved in the RAM or the like of the ECU 14. After the completion of the processing of step S201, the ECU 14 executes the processing of step S202 next.

In step S202, the ECU 14 determines whether or not the engine load Q retrieved in step S201 is lower than a predetermined load Qpre. The predetermined load Qpre mentioned above is a value of the engine load Q at or below which the thermal efficiency is supposed to be higher in the case where cylinder deactivation is performed (namely, the internal combustion engine 1 operates with fewer cylinders) than in the case where the internal combustion engine 1 operates with all the cylinders.

If a negative determination is made in step S202 (Q>Qpre), the ECU 14 executes the processing of step S206 next. In step S206, the ECU 14 causes all the cylinders of the internal combustion engine 1 to operate (all-cylinder operation). Specifically, the ECU 14 causes the fuel injection valve 12 and the ignition plug 13 to operate and controls the first variable valve actuation system 100 and the second variable valve actuation system 110 so as to bring the intake and exhaust valves 8, 9 into the active mode in all the cylinders of the internal combustion engine 1.

If an affirmative determination is made in step S202 (Q≤Qpre), the ECU 14 executes the processing of step S203 next. In step S203, the ECU 14 determines whether or not the enable flag is ON. As described above, the enable flag is set to ON when the hydraulic oil temperature Toil is in the temperature range in which the skip firing control may be performed and to OFF when the hydraulic oil temperature Toil is not in the temperature range in which the skip firing control may be performed. The enable flag has been set in the above-described processing routine shown in FIG. 6.

If a negative determination is made in step S203 (enable flag=OFF), it may be concluded that the hydraulic oil temperature Toil is not in the temperature range in which the skip firing control may be performed. Then, the ECU 14 executes the processing of step S207 next. In step S207, the ECU 14 executes the fixed deactivated cylinder control. Specifically, the ECU 14 suspends the operation of the fuel injection valve 12 and the ignition plug 13 and controls the first variable valve actuation system 100 and the second variable valve actuation system 110 so as to bring the intake and exhaust valves 8, 9 in specific cylinders of the internal combustion engine 1. The number of deactivated cylinders is larger when the engine load Q is low than when the engine load Q is high.

On the other hand, if an affirmative determination is made in step S203 (enable flag=ON), it may be concluded that the hydraulic oil temperature Toil is in the temperature range in which the skip firing control may be performed. Then, the ECU 14 executes the processing of step S204 next. In step S204, the ECU 14 determines whether or not the engine speed Ne retrieved in step S201 is equal to or lower than the first engine speed Ne1. As described above, the first engine speed Ne1 is a value of the engine speed Ne above which the switchable time is supposed to be shorter than the mode switching time. The first engine speed Ne1 is set in the above-described processing routine shown in FIG. 7.

If an affirmative determination is made in step S204 (Ne≤Ne1), it may be concluded that the hydraulic oil temperature Toil is in the temperature range in which the skip firing control may be performed and the engine speed Ne is in the engine speed range in which the skip firing control may be performed. In other words, if an affirmative determination is made in step S204, it may be concluded that the internal combustion engine 1 is operating in an operation range in which the switchable time is longer than the mode switching time. Therefore, if an affirmative determination is made in step S204, the ECU 14 executes the processing of step S205 next to perform the skip firing control. In performing the skip firing control, the ECU 14 determines the cylinders to be deactivated in each cycle and the number of deactivated cylinders on the basis of the engine load Q and the tables shown in FIGS. 4(*a*) and 4(*b*).

On the other hand, if a negative determination is made in step S204 (Ne>Ne1), it may be concluded that while the hydraulic oil temperature Toil is in the temperature range in which the skip firing control may be performed, the engine speed Ne is not in the engine speed range in which the skip firing control may be performed. In other words, if a negative determination is made in step S204, it may be concluded that the internal combustion engine is operating in an operation range in which the switchable time is shorter than the mode switching time. Therefore, if a negative determination is made in step S204, the ECU 14 executes the processing of step S207 to perform the fixed deactivated cylinder control.

According to the processing shown in FIG. 8, in the case where the hydraulic oil temperature Toil is in the temperature range in which the skip firing control may be performed, cylinder deactivation is performed in the internal combustion engine 1 by the skip firing control in the operation range (skip firing range) in which the switchable time is longer than the mode switching time, but the skip firing control is not performed in the operation range (fixed deactivated cylinder range) in which the switchable time is shorter than the mode switching time. In consequence, increases in harmful exhaust emissions and misfire are prevented from being caused by the incompletion of the mode switching operation by the first variable valve actuation system 100 (the second variable valve actuation system 110) within the switchable time. In the fixed deactivated cylinder range, cylinder deactivation is performed in the internal combustion engine 1 by the fixed deactivated cylinder control instead of the skip firing control. Therefore, the thermal efficiency of the internal combustion engine 1 can be enhanced while preventing increases in harmful exhaust emissions and misfire from occurring.

The controller according to the present disclosure is embodied by the ECU 14 in executing the processing routines shown in FIGS. 6 and 8.

Second Embodiment

A second embodiment of the present disclosure will be described next with reference to FIGS. 9 to 11. In the following, features in the second embodiment that are different from those in the first embodiment will be described, and like features will not be described. The difference between the second embodiment and the above-described first embodiment resides in that while the threshold of the engine speed at which the skip firing control is switched to the fixed deactivated cylinder control is set at the first engine speed, the threshold of the engine speed at which the fixed deactivated cylinder control is switched to the skip firing control is set at a second engine speed lower than the first engine speed.

The degree of fluctuations of the engine speed Ne tend to be larger when cylinder deactivation is performed in the internal combustion engine 1 than when the all-cylinder operation is performed in the internal combustion engine 1. For this reason, even in cases where the operation condition of the internal combustion engine 1 is stable with the engine speed Ne close to the first engine speed Ne1, there is a possibility that the engine speed Ne may fluctuate above and below the first engine speed Ne1. In such cases, if the threshold of the engine speed at which the fixed deactivated cylinder control is switched to the skip firing control is set at the same value as the first engine speed Ne1 as the threshold at which the skip firing control is switched to the fixed deactivated cylinder control, there is a possibility that the engine speed Ne may become higher than the first engine speed Ne1 again soon after switching from the fixed deactivated cylinder control to the skip firing control and the engine speed Ne may become lower than the first engine speed Ne1 again soon after switching from the skip firing control to the fixed deactivated cylinder control. Thus, there is a possibility that switching from the fixed deactivated cylinder control to the skip firing control and switching from the skip firing control to the fixed deactivated cylinder control may occur alternately in short intervals, resulting in hunting in control. To avoid this, the threshold of the engine speed at which the fixed deactivated cylinder control is switched to the skip firing control is set at a second engine speed Ne2 lower than the first engine speed Ne1, in this embodiment.

(Method of Setting First and Second Engine Speeds)

A method of setting the first engine speed Ne1 and the second engine speed Ne2 in this embodiment will be described with reference to FIGS. 9 and 10. FIG. 9 is a flow chart of a processing routine executed by the ECU 14 to set the first engine speed Ne1 and the second engine speed Ne2. FIG. 10 is a graph showing relationship between the first engine speed Ne1 and the second engine speed Ne2. In FIG. 9, the processing same as that in the above-described processing routine shown in FIG. 6 are denoted by the same reference signs. In the processing shown in FIG. 9, the method of setting the first engine speed Ne1 is the same as that shown in FIG. 6.

In the processing routine shown in FIG. 9, after the first engine speed Ne1 is set in the processing of step S105 or S107, the ECU 14 executes the processing of step S108. In step S108, the ECU 14 calculates the second engine speed Ne2 by subtracting a subtraction value Cq from the first engine speed Ne1 set in step S105 or S107 (Ne 2=Ne1−Cq). The subtraction value Cq mentioned above is a positive value larger than zero, and the lower the engine load Q is, the larger the subtraction value Cq is set.

The second engine speed Ne2 set as above is an engine speed that is lower than the first engine speed Ne1 and decreases with decreasing engine load Q as indicated by the dash-dot line in FIG. 10. The reason why the second engine speed Ne2 is varied depending on the engine load Q is that the higher the engine load Q is, the larger the number of cylinders deactivated in the skip firing control or the fixed deactivated cylinder control is, and larger the degree of fluctuations of the engine speed Ne is. Setting the second engine speed Ne2 in the above-described manner can prevent switching between the skip firing control and the fixed deactivated cylinder control from occurring alternately at short intervals in the operation state in which the engine speed Ne is close to the first engine speed Ne1. Thus, hunting in control can be prevented from occurring.

(Method of Performing Cylinder Deactivation in Second Embodiment)

In the following, the procedure of cylinder deactivation in this embodiment will be described with reference to FIG. 11. FIG. 11 is a flow chart of a processing routine executed by the ECU 14 when performing cylinder deactivation in the internal combustion engine 1. This processing routine is stored in the ROM of the ECU 14 and executed repeatedly during the operation of the internal combustion engine 1. In FIG. 11, the processing steps the same as those in FIG. 8 are denoted by the same reference signs.

In the processing routine shown in FIG. 11, if an affirmative determination is made in step S204, the ECU 14 executes the processing of step S301 next. In step S301, it is determined whether or not the fixed deactivated cylinder control is being performed. If the control mode has been switched from the skip firing control to the fixed deactivated cylinder control and the engine speed Ne is changing from engine speeds higher than the first engine speed Ne1 to engine speeds lower than the first engine speed Ne1 at that time, the fixed deactivated cylinder control is being performed. Then, an affirmative determination is made in step S301. If an affirmative determination is made in step S301, then in step S302 the ECU 14 determines whether or not the engine speed Ne retrieved in step S201 is equal to or lower than the second engine speed Ne2. If an affirmative determination is made in step S302, then in step S205 the ECU 14 switches the control from the fixed deactivated cylinder control to the skip firing control. On the other hand, if a negative determination is made in step S302 (Ne>Ne2), then in step S207 the ECU 14 continues the fixed deactivated cylinder control. If a negative determination is made in step S301, the ECU 14 skips the processing of step S302 and executes the processing of step S205.

The processing shown in FIG. 11 can prevent switching between the skip firing control and the fixed deactivated cylinder control from occurring at short intervals in the operation state in which the engine speed Ne is close to the first engine speed Ne1. Thus, hunting in control can be prevented from occurring.

Third Embodiment

A third embodiment of the present disclosure will be described with reference to FIGS. 12 and 13. In the following, features in the third embodiment that are different from those in the above-described first embodiment will be described, and like features will not be described. The difference between the third embodiment and the above-described first embodiment resides in that the first engine speed is corrected taking account of changes in the mode switching time resulting from deterioration of the hydraulic oil over time.

As deterioration of the hydraulic oil in the first variable valve actuation system 100 and the second variable valve actuation system 110 progresses over time, the response speed of the first variable valve actuation system 100 and the second variable valve actuation system 110 lowers. This is because the rate of change of the hydraulic oil pressure during mode switching between the inactive mode and the active mode by the first variable valve actuation system 100 (the second variable valve actuation system 110) decreases with progress of deterioration of the hydraulic oil over time. More particularly, the rate of change of the hydraulic oil pressure immediately after the switching between the application and the relaxation of the hydraulic oil pressure to the operation chamber of the first variable valve actuation system 100 (the second variable valve actuation system 110) decreases with progress of deterioration of the hydraulic oil over time. If the response speed of the first variable valve actuation system 100 (the second variable valve actuation system 110) decreases due to deterioration of the hydraulic oil over time, there is a possibility that the mode switching time may become longer than a presumed time. For this reason, as the deterioration of the hydraulic oil progresses to some degree over time circumstances in which the switchable time becomes shorter than mode switching time can arise at engine speeds lower than the presumed first engine speed Ne1.

In this embodiment, the rate of change of the hydraulic oil pressure is determined when the mode switching by the first variable valve actuation system 100 (the second variable valve actuation system 110) is being performed in the operation range in which the engine speed Ne is equal to or lower than a predetermined threshold that is lower than the first engine speed Ne1, and the first engine speed Ne1 is corrected according to the rate of change of the hydraulic oil pressure. To determine the rate of change of the hydraulic oil pressure, it is necessary to measure the hydraulic oil pressure in the first variable valve actuation system 100 (the second variable valve actuation system 110). In this embodiment, an oil pressure sensor 126 for measuring the hydraulic oil pressure is provided in the hydraulic pressure channel between the OCV 125 and the operation chamber as shown in FIG. 12, and the output signal of the oil pressure sensor 126 is input to the ECU 14.

It is desirable that the determination of the rate of change of the hydraulic oil pressure and the correction of the first engine speed Ne1 based on the rate of change be performed when the engine speed Ne is sufficiently lower than the first engine speed Ne1 before correction. This is because if the aforementioned determination and correction are performed when the engine speed is close to the first engine speed Ne1 before correction, there is a possibility that circumstances in which the switchable time becomes shorter than mode switching time may arise before the correction of the first engine speed Ne1 is performed.

In this embodiment, the rate of change of the hydraulic oil pressure is determined when the engine speed Ne is equal to or lower than a specific threshold that is sufficiently lower than the first engine speed Ne1 before correction, and if the determined rate of change of the hydraulic oil pressure is lower than a specific criterion value, the first engine speed Ne1 is corrected to a lower engine speed. The specific threshold mentioned above is, for example, an engine speed that is so low that the switchable time will not become shorter than the mode switching time even if the hydraulic oil is deteriorated. The specific criterion value mentioned above is a value of the rate of change of the hydraulic oil pressure below which the mode switching time is supposed to become longer than a presumed time.

(Method of Correcting the First Engine Speed)

In the following a process of correcting the first engine speed Ne1 will be described with reference to FIG. 13. FIG.

13 is a flow chart of a processing routine executed by the ECU 14 to correct the first engine speed Ne1. This processing routine is stored in the ROM of the ECU 14 and executed repeatedly during the operation of the internal combustion engine 1.

In the processing routine shown in FIG. 13, firstly in step S401, the ECU 14 retrieves the hydraulic oil temperature Toil and the engine speed Ne. Then, in step S402, the ECU 14 determines whether or not the hydraulic oil temperature Toil retrieved in step S401 is equal to or higher than the aforementioned lower limit temperature Tmp0. If a negative determination is made in step S402 (Toil<Tmp0), the enable flag is set to OFF as described above description with FIGS. 6 and 8, and the skip firing control is not performed. Then, the rate of change Vp of the hydraulic pressure during the mode switching by the first variable valve actuation system 100 (the second variable valve actuation system 110) cannot be determined. Therefore, if a negative determination is made in step S402, the ECU 14 terminates the execution of this processing routine without performing determination of the rate of change Vp and correction of the first engine speed Ne1. On the other hand, if an affirmative determination is made in step S402, the ECU 14 executes the processing of step S403 next.

In step S403, the ECU 14 determines whether or not the engine speed Ne read in step S401 is equal to or lower than the specific threshold Nethre. As described above, the specific threshold Nethre is a value of the engine speed that is sufficiently lower than the first engine speed Ne1 before correction and so low that the switchable time does not become shorter than the mode switching time even if the hydraulic oil is deteriorated. If a negative determination is made in step S403 (Ne>Nethre), the ECU 14 terminates the execution of this processing routine. On the other hand, if an affirmative determination is made in step S403 (Ne≤Nethre), the ECU 14 executes the processing of step S404 next.

In step S404, the ECU 14 calculates the rate of change Vp of the hydraulic pressure during the mode switching by the first variable valve actuation system 100 (the second variable valve actuation system 110). For example, the ECU 14 may calculate the change in the hydraulic pressure during a specific time from the measurement value of the hydraulic pressure sensor 126 at the time when the mode switching control of the first variable valve actuation system 100 (the second variable valve actuation system 110) is started and the measurement value of the hydraulic pressure sensor 126 after the lapse of the aforementioned specific time from that time and calculate the rate of change Vp from the change in the hydraulic pressure thus calculated. Alternatively, the ECU 14 may calculate the length of time from the time when the mode switching control of the first variable valve actuation system 100 (the second variable valve actuation system 110) is started to the time when the measurement value of the hydraulic oil sensor 126 reaches a specific value and calculate the rate of change Vp from the length of time thus calculated. The ECU 14 embodies the acquirer according to the present disclosure in executing the processing of step S404.

After the completion of the processing of step S404, the ECU 14 determines whether or not the rate of change Vp is lower than a specific criterion value Vst in step S405. As described above, the specific criterion value Vst is a value of the rate of change Vp of the hydraulic oil pressure below which the mode switching time is supposed to become longer than a presumed time. As described in the description with FIG. 7, while the mode switching time is substantially constant when the hydraulic oil temperature Toil is equal to or higher than the warming-up completion temperature Tmp1, the mode switching time varies depending on the hydraulic oil temperature Toil when the hydraulic oil temperature Toil is in the temperature range equal to or higher than the lower limit temperature Tmp0 and lower than the warming-up completion temperature Tmp1. The specific criterion value Vst used in the processing of step S405 may be set taking account of this tendency. Specifically, if the hydraulic oil temperature Toil retrieved in step S401 is equal to or higher than warming-up completion temperature Tmp1, the specific criterion value Vst may be set to a specific fixed value. If the hydraulic oil temperature Toil is in the temperature range equal to or higher than the lower limit temperature Tmp0 and lower than the warming-up completion temperature Tmp1, the specific criterion value Vst may be set as a variable value that is smaller than the aforementioned specific fixed value and decreased with decreasing hydraulic oil temperature Toil.

If a negative determination is made in step S405, it may be concluded that the deterioration of the hydraulic oil has not progressed yet to a degree that makes the mode switching time longer than a presumed length of time. Then, the ECU 14 terminates the execution of this processing routine without performing correction of the first engine speed Ne1. On the other hand, if an affirmative determination is made in step S405, it may be concluded that the deterioration of the hydraulic oil has progressed to a degree that makes the mode switching time longer than a presumed length of time. Then, it is necessary to correct the first engine speed Ne1. Hence, if an affirmative determination is made in step S405, the ECU 14 executes the processing of step S406 next.

In step S406, the ECU 14 corrects the first engine speed Ne1 by subtracting a correction value $\Delta$Ne from the presently set first engine speed Ne1old. The correction value $\Delta$Ne is a positive value that is determined according to the difference $\Delta$V between the rate of change Vp determined in the processing of step S404 and the aforementioned specific criterion value Vst ($\Delta$V=Vst-Vp). For example, the larger the aforementioned difference $\Delta$V is, the larger the correction value $\Delta$Ne is set.

By correcting the first engine speed Ne1 by the processing shown in FIG. 13, the skip firing control is prevented from being performed in the operation range in which the switchable time is shorter than the mode switching time with improved reliability even if the hydraulic oil is deteriorated.

In the case where the second engine speed Ne2 is set in addition to the first engine speed Ne1 as described in the description of the second embodiment, the second engine speed Ne2 may also be corrected in the same manner as the correction of the first engine speed Ne1. Specifically, in cases where the first engine sped Ne1 is corrected, the second engine speed Ne2 may be corrected by subtracting the correction value $\Delta$Ne from the presently set second engine speed Ne2old. By correcting the second engine speed Ne2, the skip firing control and the fixed deactivated cylinder control is prevented from occurring alternately at short intervals even if the hydraulic oil is deteriorated over time.

Other Embodiments

While in the above-described first to third embodiments, the engine load is used as a parameter in switching cylinder deactivation and all-cylinder operation and changing the number of deactivated cylinders in cylinder deactivation, the engine load factor (i.e. the ratio of the actual intake air quantity to the intake air quantity at full load) may be used as a parameter alternatively.

While in the above-described first to third embodiments, the variable valve actuation system of the internal combustion engine to which the present disclosure is applied is a hydraulic variable valve actuation system that switches the mode of operation of the intake and exhaust valves between the inactive mode and the active mode using the pressure of hydraulic oil, a solenoid variable valve actuation system that switches the mode of operation of the intake and exhaust valves between the inactive mode and the active mode using a solenoid may be employed alternatively. In the case where the present disclosure is applied to an internal combustion engine having a solenoid variable valve actuation system, it is not necessary to change the first engine speed Ne1 or the second engine speed Ne2 depending on the hydraulic oil temperature.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

What is claimed is:

1. A control apparatus for an internal combustion engine equipped with a plurality of cylinders, a variable valve actuation system capable of switching the operation mode of intake and exhaust valves of each of the cylinders between an inactive mode in which the operation of opening/closing the intake and exhaust valves of the cylinder is disabled and an active mode in which the operation of opening/closing the intake and exhaust valves of the cylinder is enabled on a cylinder-by-cylinder basis, and a fuel injection valve that supplies fuel into each of the cylinders of the internal combustion engine, comprising:
a controller capable of performing skip firing control, which is the control of deactivating some of the cylinders by causing said variable valve actuation system to set the operation mode of the intake and exhaust valves of the some of the cylinders to the inactive mode and causing the fuel injection valve of the some of the cylinders to suspend supply of fuel and changing the deactivated cylinders,
wherein said controller performs said skip firing control when the engine speed is equal to or lower than a first engine speed and does not perform said skip firing control when the engine speed is higher than said first engine speed,
wherein when the engine speed is higher than said first engine speed, said controller performs fixed deactivated cylinder control to control said variable valve actuation system and said fuel injection valve in such a way as to deactivate specific cylinders among the plurality of cylinders,
wherein after the engine speed has become higher than said first engine speed, said controller performs said fixed deactivated cylinder control and does not perform said skip firing control until the engine speed becomes lower than a second engine speed lower than said first engine speed.

2. A control apparatus for an internal combustion engine according to claim 1, wherein in performing said skip firing control or said fixed deactivated cylinder control, said controller deactivates a larger number of cylinders and sets said second engine speed lower when the engine load is low than when the engine load is high.

3. A control apparatus for an internal combustion engine according to claim 1, wherein said variable valve actuation system is adapted to switch the operation mode of the intake and exhaust valves between the inactive mode and the active mode using a pressure of hydraulic oil.

4. A control apparatus for an internal combustion engine according to claim 2, wherein said variable valve actuation system is adapted to switch the operation mode of the intake and exhaust valves between the inactive mode and the active mode using a pressure of hydraulic oil.

5. A control apparatus for an internal combustion engine according to claim 3, further comprising a detector that measures the temperature of hydraulic oil in said variable valve actuation system, wherein when the temperature of hydraulic oil measured by said detector is lower than a warming-up completion temperature, said controller sets said first engine speed lower when the temperature of hydraulic oil is low than when the temperature of hydraulic oil is high.

6. A control apparatus for an internal combustion engine according to claim 1, further comprising a detector that measures the temperature of hydraulic oil in said variable valve actuation system, wherein when the temperature of hydraulic oil measured by said detector is lower than a warming-up completion temperature, said controller sets said first engine speed lower when the temperature of hydraulic oil is low than when the temperature of hydraulic oil is high.

7. A control apparatus for an internal combustion engine according to claim 2, further comprising a detector that measures the temperature of hydraulic oil in said variable valve actuation system, wherein when the temperature of hydraulic oil measured by said detector is lower than a warming-up completion temperature, said controller sets said first engine speed lower when the temperature of hydraulic oil is low than when the temperature of hydraulic oil is high.

8. A control apparatus for an internal combustion engine according to claim 4, further comprising a detector that measures the temperature of hydraulic oil in said variable valve actuation system, wherein when the temperature of hydraulic oil measured by said detector is lower than a warming-up completion temperature, said controller sets said first engine speed lower when the temperature of hydraulic oil is low than when the temperature of hydraulic oil is high.

9. A control apparatus for an internal combustion engine according to claim 5, further comprising an acquirer that acquires the rate of change of the pressure of hydraulic oil when switching between the inactive mode and the active mode is being performed by said variable valve actuation system, wherein if the rate of change acquired by said acquirer is lower than a specific criterion value when the engine speed is lower than a specific threshold lower than said first engine speed, said controller corrects said first engine speed to a lower engine speed.

10. A control apparatus for an internal combustion engine according to claim 6, further comprising an acquirer that acquires the rate of change of the pressure of hydraulic oil when switching between the inactive mode and the active mode is being performed by said variable valve actuation system, wherein if the rate of change acquired by said acquirer is lower than a specific criterion value when the engine speed is lower than a specific threshold lower than said first engine speed, said controller corrects said first engine speed to a lower engine speed.

11. A control apparatus for an internal combustion engine according to claim 7, further comprising an acquirer that acquires the rate of change of the pressure of hydraulic oil when switching between the inactive mode and the active mode is being performed by said variable valve actuation system, wherein if the rate of change acquired by said acquirer is lower than a specific criterion value when the engine speed is lower than a specific threshold lower than said first engine speed, said controller corrects said first engine speed to a lower engine speed.

12. A control apparatus for an internal combustion engine according to claim 8, further comprising an acquirer that acquires the rate of change of the pressure of hydraulic oil when switching between the inactive mode and the active mode is being performed by said variable valve actuation system, wherein if the rate of change acquired by said acquirer is lower than a specific criterion value when the engine speed is lower than a specific threshold lower than said first engine speed, said controller corrects said first engine speed to a lower engine speed.

13. A control apparatus for an internal combustion engine comprising:
- a plurality of cylinders;
- a variable valve actuation system; and
- a fuel injection valve that supplies fuel into each of the cylinders of the internal combustion engine,
- wherein the variable valve actuation system is configured to switch the operation mode of intake and exhaust valves of each of the cylinders between a mode in which the operation of opening/closing the intake and exhaust valves of the cylinder is disabled and a mode in which the operation of opening/closing the intake and exhaust valves of the cylinder is enabled on a cylinder-by-cylinder basis,
- wherein in a specific operation range in which a switchable time is longer than a time taken for the variable valve actuation system to carry out the mode switching operation, the control apparatus is configured to:
- deactivate some of the cylinders by causing said variable valve actuation system to set the mode in which the operation of opening/closing the intake and exhaust valves of the some of the cylinders is disabled and causing the fuel injection valve of the some of the cylinders to suspend supply of fuel; and
- change the deactivated cylinders without changing a number of deactivated cylinders,
- wherein the specific operation range is a range in which an engine speed is equal to or lower than a first engine speed,
- wherein the first engine speed is an engine speed by which a certain margin is subtracted from an engine speed above which the switchable time is shorter than the mode switching time.

* * * * *

UNITED STATES PATENT AND TRADEMARK OFFICE
CERTIFICATE OF CORRECTION

PATENT NO. : 10,634,069 B2
APPLICATION NO. : 15/982321
DATED : April 28, 2020
INVENTOR(S) : Yoshiro Kamo and Masatoshi Sugiura It is certified that error appears in the above-identified patent and that said Letters Patent is hereby corrected as shown below:

On the Title Page (72), inventors, inventor 1, address, delete "Kanagawa-ken" and insert --Ashigarakami-gun Kanagawa-ken--, therefor.

(72), inventors, inventor 2, address, delete "Nishio" and insert --Nishio-shi Aichi-ken--, therefor.

In the Drawings

In drawing sheets 14 of 14, figure 13, block S404, delete "CALCURATE $V_P$" and insert --CALCULATE $V_P$--, therefor.

In the Specification

Column 1, Lines 53, delete "CITATION LIST" and insert --Citation List--, therefor.

Signed and Sealed this
Ninth Day of June, 2020

Andrei Iancu
*Director of the United States Patent and Trademark Office*